United States Patent
Hitomi et al.

(10) Patent No.: US 10,091,442 B2
(45) Date of Patent: Oct. 2, 2018

(54) IMAGE PROCESSING APPARATUS AND IMAGE PROCESSING METHOD

(71) Applicant: Sony Semiconductor Solutions Corporation, Kanagawa (JP)

(72) Inventors: Yasunobu Hitomi, Kanagawa (JP); Tomoo Mitsunaga, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/322,741

(22) PCT Filed: Jul. 1, 2015

(86) PCT No.: PCT/JP2015/068967
§ 371 (c)(1),
(2) Date: Dec. 29, 2016

(87) PCT Pub. No.: WO2016/009837
PCT Pub. Date: Jan. 21, 2016

(65) Prior Publication Data
US 2017/0142354 A1    May 18, 2017

(30) Foreign Application Priority Data
Jul. 15, 2014 (JP) .................. 2014-144773

(51) Int. Cl.
*H04N 5/357* (2011.01)
*H04N 5/376* (2011.01)
*H04N 5/378* (2011.01)
*H04N 5/232* (2006.01)
*H04N 5/235* (2006.01)

(52) U.S. Cl.
CPC ........... *H04N 5/357* (2013.01); *H04N 5/2327* (2013.01); *H04N 5/2352* (2013.01); *H04N 5/378* (2013.01); *H04N 5/3765* (2013.01)

(58) Field of Classification Search
CPC .... H04N 5/357; H04N 5/2352; H04N 5/2327; H04N 5/3765; H04N 5/378
See application file for complete search history.

(56) References Cited

U.S. PATENT DOCUMENTS

2011/0096216 A1    4/2011    Kawai et al.

FOREIGN PATENT DOCUMENTS

| JP | 10-174000 A | 6/1998 |
|----|-------------|--------|
| JP | 2001-61106 A | 3/2001 |
| JP | 2011-61514 A | 3/2011 |

*Primary Examiner* — Padma Haliyur
(74) *Attorney, Agent, or Firm* — Wolf, Greenfield & Sacks, P.C.

(57) ABSTRACT

The present disclosure relates to an image processing apparatus and an image processing method which enable sufficient increase in an SNR of a dark place in a moving image. An image sensor has a plurality of pixels whose image pickup signal has a read interval as a first multiple of a vertical synchronization period or as a second multiple larger than the first multiple of the vertical synchronization period. A frame memory holds an image pickup signal of a long-time accumulated pixel as the pixel having a read interval as the second multiple of the vertical synchronization period. The present disclosure can be applied to an image processing apparatus which includes an image sensor and a frame memory and generates a moving image, and the like.

12 Claims, 22 Drawing Sheets

FIG. 3

| R2 | G2 | R2 | G2 | R2 | G2 | R2 | G2 |
|----|----|----|----|----|----|----|----|
| G2 | B2 | G2 | B2 | G2 | B2 | G2 | B2 |
| R1 | G1 | R1 | G1 | R1 | G1 | R1 | G1 |
| G1 | B1 | G1 | B1 | G1 | B1 | G1 | B1 |
| R2 | G2 | R2 | G2 | R2 | G2 | R2 | G2 |
| G2 | B2 | G2 | B2 | G2 | B2 | G2 | B2 |
| R1 | G1 | R1 | G1 | R1 | G1 | R1 | G1 |
| G1 | B1 | G1 | B1 | G1 | B1 | G1 | B1 |

| R2 | G2 | R1 | G2 | R2 | G2 | R1 | G2 |
|----|----|----|----|----|----|----|----|
| G1 | B2 | G1 | B1 | G1 | B2 | G1 | B1 |
| R1 | G2 | R2 | G2 | R1 | G2 | R2 | G2 |
| G1 | B1 | G1 | B2 | G1 | B1 | G1 | B2 |
| R2 | G2 | R1 | G2 | R2 | G2 | R1 | G2 |
| G1 | B2 | G1 | B1 | G1 | B2 | G1 | B1 |
| R1 | G2 | R2 | G2 | R1 | G2 | R2 | G2 |
| G1 | B1 | G1 | B2 | G1 | B1 | G1 | B2 |

B

| R2 | R1 | G2 | G1 | R2 | R1 | G2 | G1 |
|----|----|----|----|----|----|----|----|
| R1 | R2 | G1 | G2 | R1 | R2 | G1 | G2 |
| G2 | G1 | B2 | B1 | G2 | G1 | B2 | B1 |
| G1 | G2 | B1 | B2 | G1 | G2 | B1 | B2 |
| R2 | R1 | G2 | G1 | R2 | R1 | G2 | G1 |
| R1 | R2 | G1 | G2 | R1 | R2 | G1 | G2 |
| G2 | G1 | B2 | B1 | G2 | G1 | B2 | B1 |
| G1 | G2 | B1 | B2 | G1 | G2 | B1 | B2 |

C

| G2 | G1 | G2 | G1 | G2 | G1 | G2 | G1 |
|----|----|----|----|----|----|----|----|
| B1 | G2 | R1 | G2 | B1 | G2 | R1 | G2 |
| G2 | G1 | G2 | G1 | G2 | G1 | G2 | G1 |
| R1 | G2 | B1 | G2 | R1 | G2 | B1 | G2 |
| G2 | G1 | G2 | G1 | G2 | G1 | G2 | G1 |
| B1 | G2 | R1 | G2 | B1 | G2 | R1 | G2 |
| G2 | G1 | G2 | G1 | G2 | G1 | G2 | G1 |
| R1 | G2 | B1 | G2 | R1 | G2 | B1 | G2 |

IMAGE PROCESSING APPARATUS AND IMAGE PROCESSING METHOD

This Application is a national stage filing under 35 U.S.C. 371 of International Patent Application Serial No. PCT/JP2015/068967, filed Jul. 1, 2015, entitled "IMAGE PROCESSING DEVICE AND IMAGE PROCESSING METHOD". Foreign priority benefits are claimed under 35 U.S.C. § 119(a)-(d) or 35 U.S.C. § 365(b) of Japanese application number 2014-144773, filed Jul. 15, 2014. The entire contents of these applications are incorporated herein by reference in their entirety.

TECHNICAL FIELD

The present disclosure relates to an image processing apparatus and an image processing method, and particularly, to an image processing apparatus and an image processing method enabling sufficient increase in a signal-noise ratio (SNR) of a dark place in a moving image.

BACKGROUND ART

In recent years, there have been proposed image sensors including pixels having different exposure lengths mixed (see e.g. Patent Document 1). In an image sensor including pixels having different exposure lengths mixed, at the time of photographing moving images, all the pixels are read and output in each vertical synchronization period. Accordingly, even in a pixel having a large exposure length, the exposure length cannot be made larger than a vertical synchronization period, so that an SNR of a dark place in a moving image is low.

Methods of improving an SNR include executing two-dimensional noise reduction (2DNR) processing in which a photographed image is subjected to filtering processing in a screen. However, it is difficult to maintain a texture of a subject while reducing noise under strong noise.

Additionally, methods of improving an SNR also include executing three-dimensional noise reduction (3DNR) processing in which noise is reduced by using a photographed image of a past frame. This method is to reduce random noise by weight-averaging an image of a past frame and an image of a present frame in a stationary subject region. Accordingly, when this method is used for a moving subject region, such image deterioration as tailing occurs in a photographed image. Accordingly, complicated processing is required such as conducting determination of a moving subject with respect to a photographed image and preventing weight-averaging from being conducted in a moving subject region.

However, in a dark place under strong noise, it is difficult to precisely determine a moving subject and noise, so that a stationary subject region might be determined to be a moving subject region and noise might not be satisfactorily reduced.

CITATION LIST

Patent Document

Patent Document 1: Japanese Patent Application Laid-Open No. 2002-135626

SUMMARY OF THE INVENTION

Problems to be Solved by the Invention

Accordingly, satisfactory improvement of an SNR of a dark place in a moving image is demanded.

In view of such circumstances, the present disclosure aims at satisfactorily improving an SNR of a dark place in a moving image.

Solutions to Problems

An image processing apparatus according to one aspect of the present disclosure includes: a plurality of pixels whose image pickup signal has a read interval as a first multiple of a vertical synchronization period or as a second multiple larger than the first multiple of the vertical synchronization period; and a holding unit which holds the image pickup signal of a long-time accumulated pixel as the pixel having the read interval as the second multiple of the vertical synchronization period.

An image processing method according to one aspect of the present disclosure corresponds to an image processing apparatus according to one aspect of the present disclosure.

In one aspect of the present disclosure, an image pickup signal is read from a pixel at a read interval which is a first multiple of a vertical synchronization period, or a second multiple larger than the first multiple of the vertical synchronization period, and the image pickup signal is maintained which is read at the read interval as the second multiple of the vertical synchronization period.

Effects of the Invention

According to one aspect of the present disclosure, an image can be captured. Additionally, according to one aspect of the present disclosure, an SNR of a dark place in a moving image can be satisfactorily improved.

Note that the effects recited herein are not necessarily limited and may be any of the effects recited in the present disclosure.

BRIEF DESCRIPTION OF DRAWINGS

FIG. 3 is a diagram showing an example of an array of pixels in FIG. 2.

FIG. 24 is a diagram showing an example of an array of pixels in FIG. 23.

MODE FOR CARRYING OUT THE INVENTION

In the following, description will be made of presuppositions of the present disclosure and modes for carrying out the present disclosure (hereinafter, referred to as an embodiment). Note that the description will be made in the following order.
1. First embodiment: image processing apparatus (FIG. 1 to FIG. 11)
2. Second embodiment: image processing apparatus (FIG. 12)
3. Third embodiment: image processing apparatus (FIG. 13)
4. Fourth embodiment: image processing apparatus (FIG. 14)
5. Fifth embodiment: image processing apparatus (FIG. 15)
6. Sixth embodiment: image processing apparatus (FIG. 16 to FIG. 19)
7. Seventh embodiment: image processing apparatus (FIG. 20 to FIG. 22)
8. Eighth embodiment: image processing apparatus (FIG. 23 to FIG. 25)
9. Ninth embodiment: image processing apparatus (FIG. 26 and FIG. 27)
10. Tenth embodiment: image processing apparatus (FIG. 28)
11. Eleventh embodiment: image processing apparatus (FIG. 29)
12. Semiconductor substrate (FIG. 30)

<First Embodiment>

(Configuration Example of First Embodiment of Image Processing Apparatus)

Figure 1:
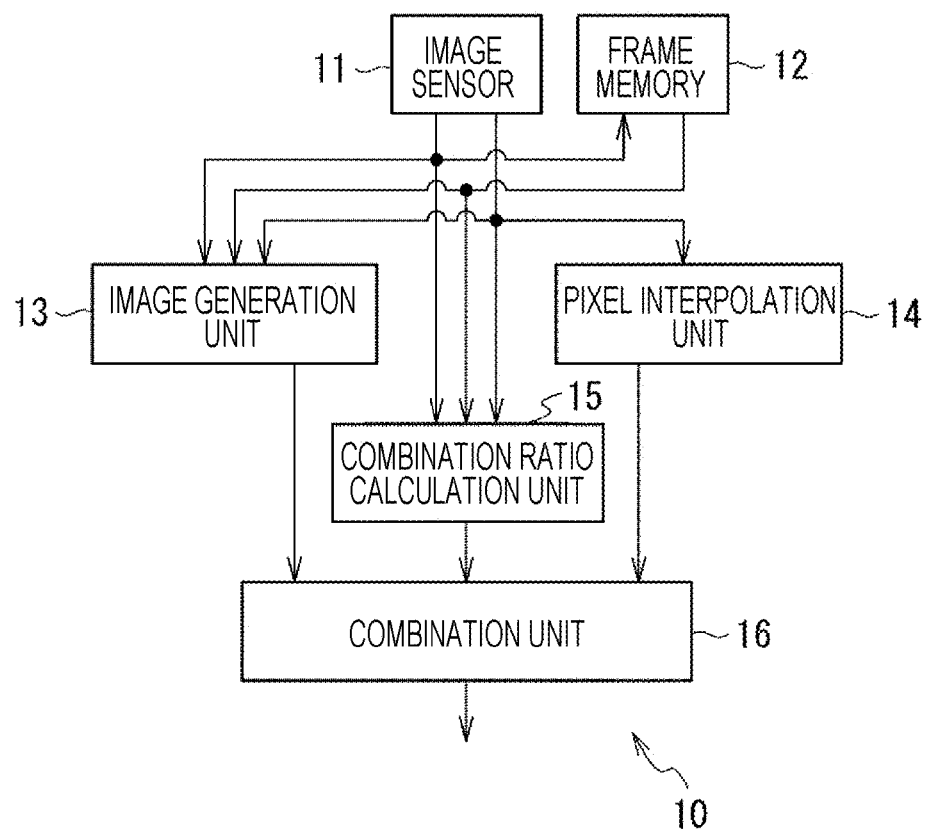
FIG. 1 is a block diagram showing a configuration example of a first embodiment of an image processing apparatus to which the present disclosure is applied.

FIG. 1 is a block diagram showing a configuration example of a first embodiment of an image processing apparatus to which the present disclosure is applied.

An image processing apparatus 10 in FIG. 1 includes an image sensor 11, a frame memory 12, an image generation unit 13, a pixel interpolation unit 14, a combination ratio calculation unit 15, and a combination unit 16. The image processing apparatus 10 generates a moving image on the basis of image pickup signals captured by pixels of different exposure lengths.

Specifically, the image sensor 11 of the image processing apparatus 10 has a plurality of pixels which are each classified into two groups according to a pattern of change with time of a read interval for an image pickup signal of each pixel. A read interval for an image pickup signal of each pixel is a multiple of 1 of a vertical synchronization period (hereinafter, referred to as a short read interval), or a multiple of 2 or more of the vertical synchronization period (hereinafter, referred to as a long read interval). Additionally, when a read interval of a pixel classified into either a first group or a second group is a short read interval, a read interval of a pixel classified into the other is a long read interval.

The image sensor 11 reads an image pickup signal of a pixel classified into the first or second group at the long read interval and supplies the same to the frame memory 12, the image generation unit 13, and the combination ratio calculation unit 15. Additionally, the image sensor 11 reads an image pickup signal of a pixel classified into the other at the short read interval and supplies the same to the image generation unit 13, the pixel interpolation unit 14, and the combination ratio calculation unit 15.

The frame memory 12 functions as a holding unit and holds image pickup signals corresponding to one screen (frame) on a group basis, which signals are read at the long read interval and supplied from the image sensor 11.

In each vertical synchronization period, the image generation unit 13 combines an image pickup signal read at the short read interval and an image pickup signal read at the long read interval which are supplied from the image sensor 11 to generate image pickup signals of all the pixels. The image pickup signal which is read at the long read interval and is to be used for the generation is supplied from the image sensor 11 or when not supplied from the image sensor 11, is read from the frame memory 12. Specifically, at other timing than the long read interval, an image pickup signal read immediately before from the same long-time accumulated pixel at the long read interval is used for generating image pickup signals of all the pixels. The image generation unit 13 supplies the generated image pickup signals of all the pixels to the combination unit 16 as image pickup signals of both read intervals.

The pixel interpolation unit 14 interpolates image pickup signals read at the short read interval and supplied from the image sensor 11 to generate image pickup signals of all the pixels and supplies the same to the combination unit 16 as short read interval image pickup signals.

In each vertical synchronization period, the combination ratio calculation unit 15 calculates a combination ratio of the image pickup signals of both read intervals to the short read interval image pickup signals on the basis of the image pickup signals read at the short read interval and the image pickup signals read at the long read interval which are supplied from the image sensor 11. The image pickup signals which are read at the long read interval and are to be used for the calculation are supplied from the image sensor 11 or when not supplied from the image sensor 11, are read from the frame memory 12. The combination ratio calculation unit 15 supplies the calculated combination ratio to the combination unit 16.

Note that the combination ratio calculation unit 15 may calculate a combination ratio at the long read interval. In this case, the combination ratio calculation unit 15 refrains from reading the image pickup signal from the frame memory 12 and calculates a combination ratio on the basis of the image pickup signals read at the short read interval and the image pickup signals read at the long read interval which are supplied from the image sensor 11.

The combination unit 16 combines the image pickup signals of both read intervals supplied from the image generation unit 13 and the short read interval image pickup signal supplied from the pixel interpolation unit 14 on the basis of a combination ratio supplied from the combination ratio calculation unit 15. The combination unit 16 outputs an image pickup signal obtained as a result of the combination as an image pickup signal of a moving image.

(Configuration Example of Image Sensor)

Figure 2:
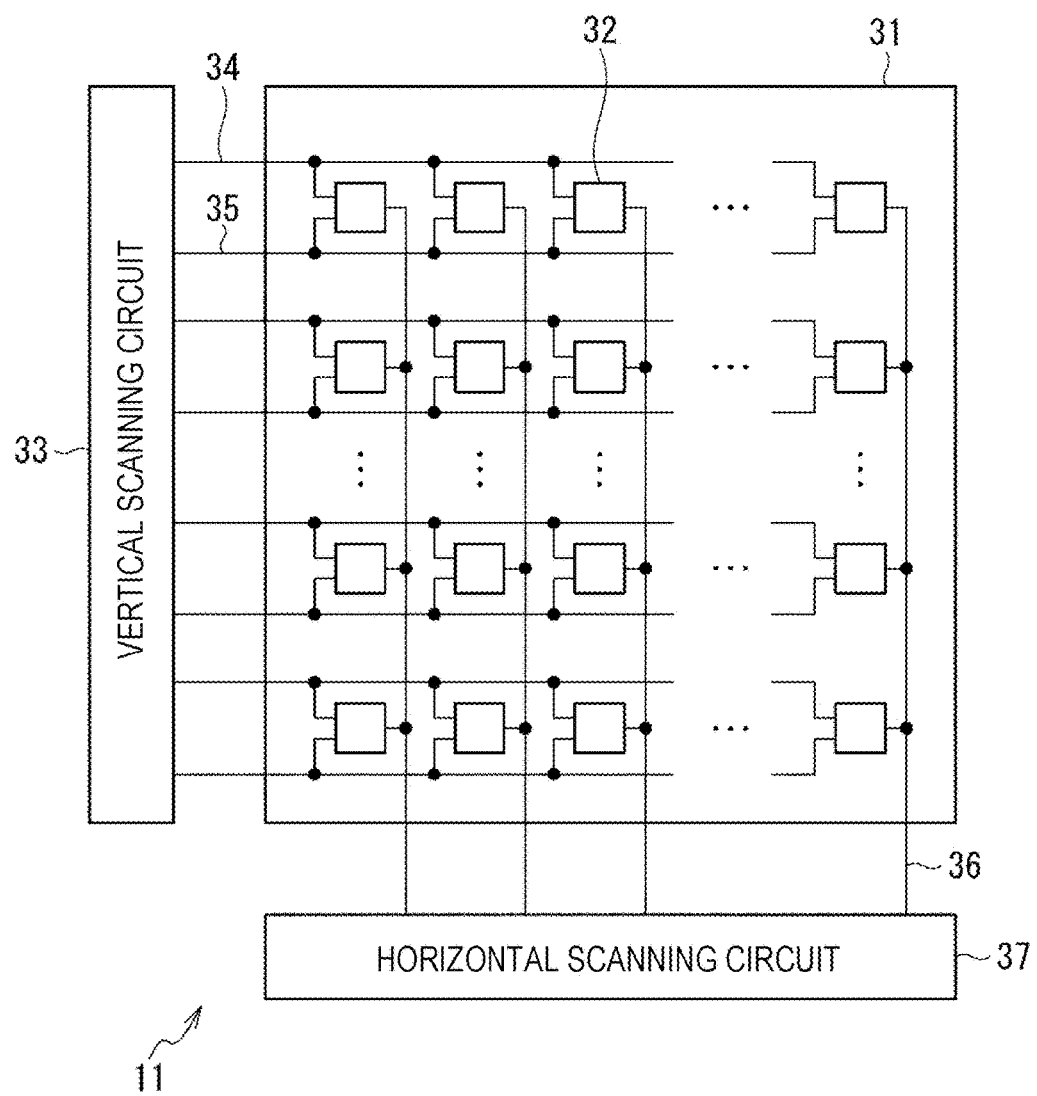
FIG. 2 is a diagram showing a configuration example of an image sensor in FIG. 1.

FIG. 2 is a diagram showing a configuration example of the image sensor 11 in FIG. 1.

The image sensor 11 in FIG. 2 includes a pixel array unit 31 configured with a plurality of pixels 32, a vertical scanning circuit 33, a horizontal reset line 34, a selection line 35, a vertical signal line 36, and a horizontal scanning circuit 37.

In the pixel array unit 31, the plurality of pixels 32 classified into the first and second groups is arranged in a two-dimensional array (in a matrix). Here, the pixels 32 are classified into the same group on a basis of two rows.

The plurality of pixels 32 arranged in the two-dimensional array is connected to the vertical scanning circuit 33 by the horizontal reset line 34 and the selection line 35 on a row basis. Additionally, the plurality of pixels 32 arranged in the two-dimensional array is connected to the horizontal scanning circuit 37 by the vertical signal line 36 on a column basis.

The vertical scanning circuit 33 sequentially selects each row of the pixels 32 in the pixel array unit 31 and supplies, to the selection line 35 of the selected row, a read signal which causes read of an image pickup signal. In response to the read signal, the pixels 32 of each row output an image pickup signal according to internally accumulated electric charges to the vertical signal line 36.

Additionally, the vertical scanning circuit 33 supplies a reset signal to the horizontal reset line 34 of the pixels 32 in each row during a short read interval or a long read interval corresponding to a group of the pixels 32 in the row before supplying a read signal. The reset signal is a signal for resetting electric charges accumulated inside the pixels 32. In response to the reset signal, the pixels 32 in each row reset the internally accumulated electric charges to start accumulating electric charges (exposure).

The horizontal scanning circuit 37 sequentially supplies the image generation unit 13, the pixel interpolation unit 14 and the combination ratio calculation unit 15 in FIG. 1 with image pickup signals read from the pixels 32 of one row at the short read interval and supplied via the vertical signal line 36. Additionally, the horizontal scanning circuit 37 sequentially supplies the frame memory 12, the image generation unit 13 and the combination ratio calculation unit 15 in FIG. 1 with image pickup signals read from the pixels 32 of one row at the long read interval and supplied via the vertical signal line 36.

(Example of Pixel Array)

FIG. 3 is a diagram showing an example of an array of the pixels 32 arranged in the pixel array unit 31 in FIG. 2.

Note that in FIG. 3, a square represents a pixel, and R, G and B applied inside the square represent that the respective pixels have color filters of red, green and blue, respectively. Additionally, 1 and 2 applied inside the square indicative of a pixel represent that a group of the pixel is the first group and the second group, respectively. Further, in FIG. 3, only 8×8 pixels 32 are illustrated among the pixels 32 arranged in the pixel array unit 31. This is also the case with FIG. 24 which will be described later.

In the example of FIG. 3, the array of the pixels 32 is a Bayer array. Additionally, as shown in FIG. 3, groups of the pixels 32 in the pixel array unit 31 alternate with each other at every two rows. Specifically, a group of the pixels 32 in the first and second rows from the top is the second group and a group of the pixels 32 in the third and fourth rows is the first group. Additionally, a group of the pixels 32 in the fifth and sixth rows is the second group, and a group of the pixels 32 in the seventh and eighth rows is the first group. Accordingly, in the example of FIG. 3, with respect to each color, there exist pixels 32 classified as the first group and pixels 32 classified as the second group.

(Example of Read Interval for Each Group)

Figure 4:
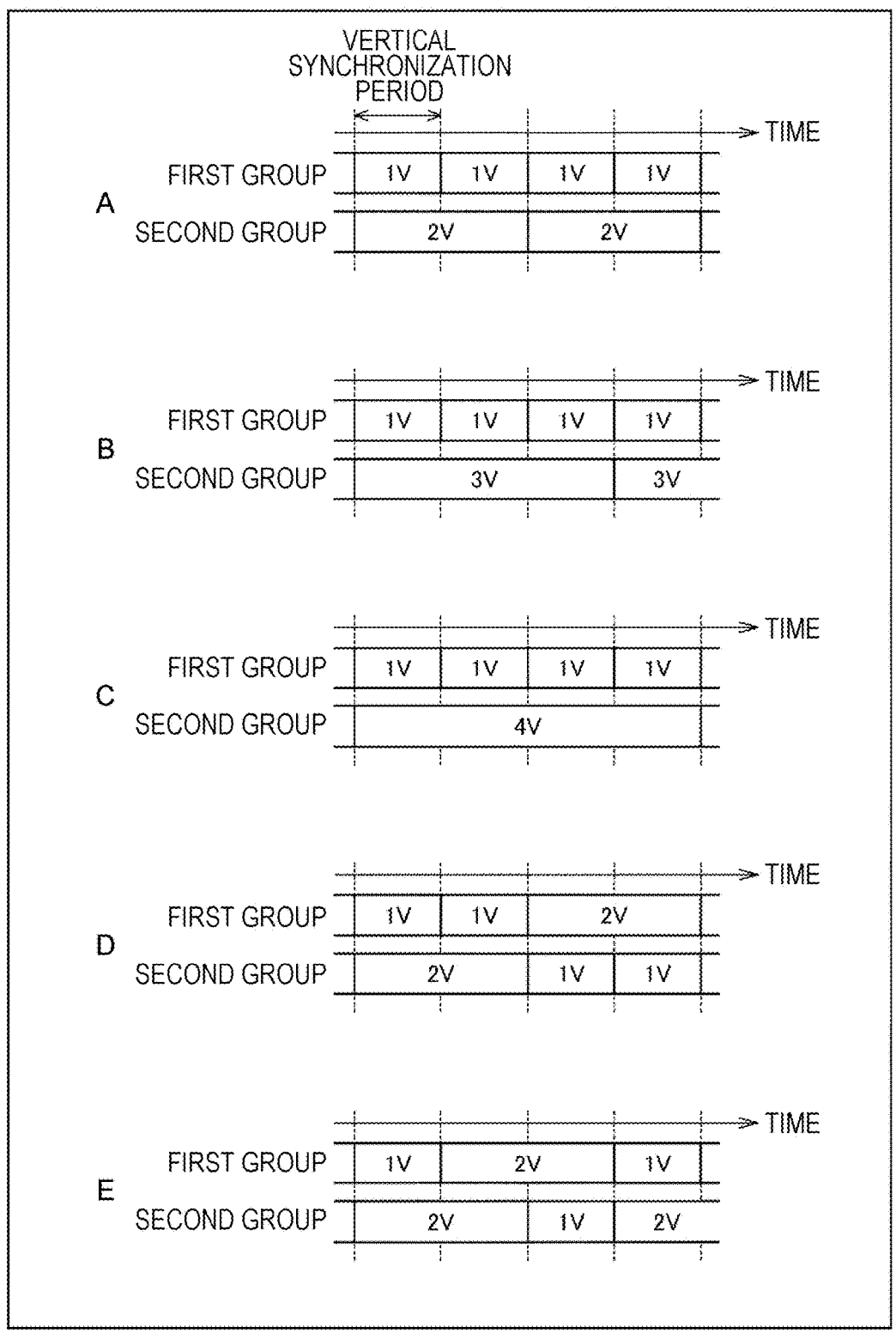
FIG. 4 is a diagram showing an example of a pixel read interval of each group.

FIG. 4 is a diagram showing an example of a read interval for the pixels 32 in each group.

In FIG. 4, a horizontal axis represents time. Additionally, in FIG. 4, a rectangle in the figure represents a read interval of an image pickup signal, and a line in a vertical direction of the rectangle represents time when the image pickup signal is read. These are also the case with FIG. 17, FIG. 18, FIG. 21 and FIG. 27 which will be described later.

As shown in A of FIG. 4 to C of FIG. 4, the pixels 32 of the first group can be set to be short-time accumulated pixels whose read interval is always a short read interval and the pixels 32 of the second group can be set to be long-time accumulated pixels whose read interval is always a long read interval.

In this case, the long read interval may be twice a vertical synchronization period (V) as shown in A of FIG. 4, may be three times the vertical synchronization period (V) as shown in B of FIG. 4, or may be four times the vertical synchronization period (V) as shown in C of FIG. 4.

Additionally, as shown in D of FIG. 4 and E of FIG. 4, the read interval for the pixels 32 of the first group and the read interval for the pixels 32 of the second group can be set to vary with time. In this case, as shown in D of FIG. 4, timing of a change of the read intervals for the pixels 32 of the first group and the second group can be set to be the same. Specifically, as shown in D of FIG. 4, the read interval for the pixels 32 of the first group can have a repetitious pattern including two short read intervals and one long read interval in order, and the read interval for the pixels 32 of the second group can have a repetitious pattern including one long read interval and two long read intervals in order.

Additionally, as show in E of FIG. 4, the read intervals for the pixels 32 of the first and second groups can be alternately changed from one of the short read interval and the long read interval to the other as well. Specifically, as shown in E of FIG. 4, the read interval for the pixels 32 of the first group can have a repetitious pattern including the short read interval and the long read interval in order, and the read interval for the pixels 32 of the second group can have a repetitious pattern including the long read interval and the short read interval in order.

Since the read intervals for the first and second groups are set in a manner as described in the foregoing, image pickup signals of the pixels 32 of at least one of the first and second groups are read in each vertical synchronization period.

(First Configuration Example of Image Generation Unit)

Figure 5:
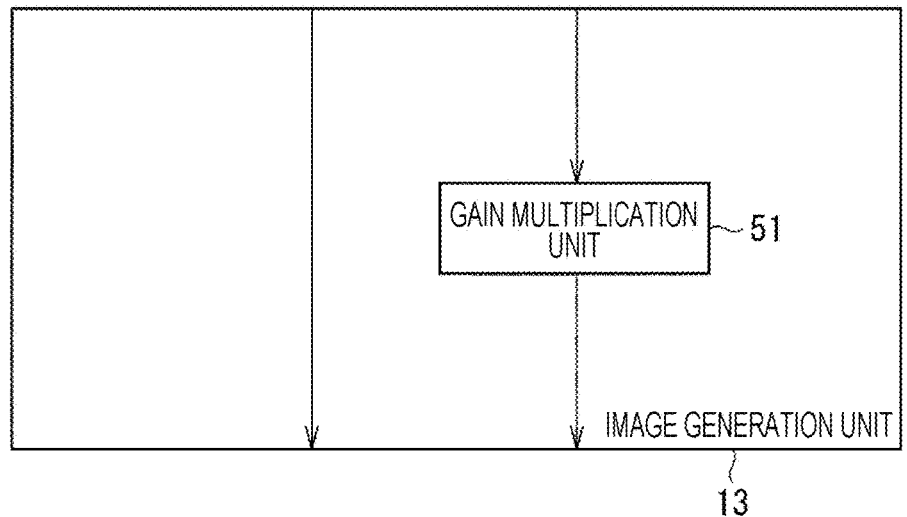
FIG. 5 is a block diagram showing a first configuration example of an image generation unit in FIG. 1.

FIG. 5 is a block diagram showing a first configuration example of the image generation unit 13 in FIG. 1.

The image generation unit 13 in FIG. 5 is configured with a gain multiplication unit 51. To the image generation unit 13, image pickup signals of long-time accumulated pixels are supplied from the image sensor 11 or the frame memory 12 in FIG. 1 in each vertical synchronization period. The image generation unit 13 supplies the image pickup signals of the long-time accumulated pixels to the combination unit 16 as image pickup signals of both read intervals of the long-time accumulated pixels in each vertical synchronization period.

Additionally, to the image generation unit 13, image pickup signals of short-time accumulated pixels are supplied from the image sensor 11, and are input to the gain multiplication unit 51 in each vertical synchronization period. The gain multiplication unit 51 multiplies the input image pickup signals of the short-time accumulated pixels by a gain corresponding to an exposure time ratio of a long-time accumulated pixel to a short-time accumulated pixel. The gain multiplication unit 51 supplies the image pickup signals of the short-time accumulated pixels with the gain multiplied to the combination unit 16 in FIG. 1 as image pickup signals of both read intervals of the short-time accumulated pixels.

(Second Configuration Example of Image Generation Unit)

Figure 6:
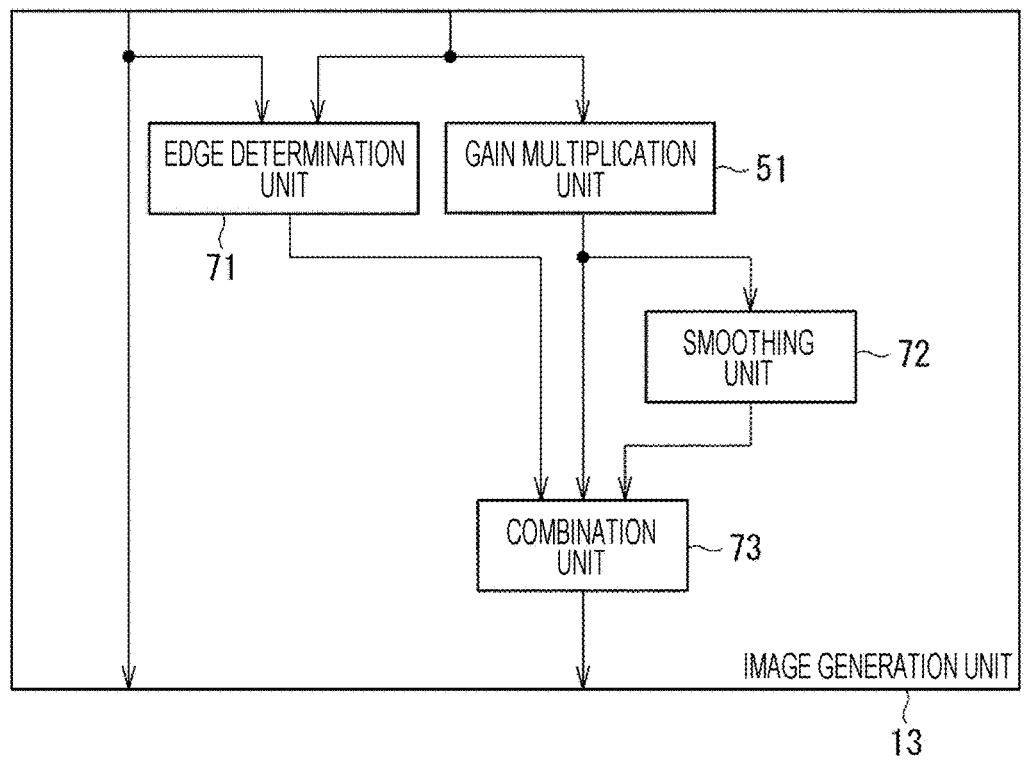
FIG. 6 is a block diagram showing a second configuration example of the image generation unit in FIG. 1.

FIG. 6 is a block diagram showing a second configuration example of the image generation unit 13 in FIG. 1.

In the configuration shown in FIG. 6, the same components as those of FIG. 5 are given the same reference codes. Overlapping description will be appropriately omitted.

The configuration of the image generation unit 13 in FIG. 6 is different from the configuration in FIG. 5 in that an edge determination unit 71, a smoothing unit 72, and a combination unit 73 are newly provided. The image generation unit 13 in FIG. 6 improves an SNR of image pickup signals of both read intervals of short-time accumulated pixels by smoothing a flattened region of an image pickup signal of a short-time accumulated pixel.

Specifically, in each vertical synchronization period, the edge determination unit 71 of the image generation unit 13 detects an edge region in a screen on the basis of an image pickup signal of a long-time accumulated pixel supplied from the image sensor 11 or the frame memory 12 in FIG. 1 and an image pickup signal of a short-time accumulated pixel supplied from the image sensor 11. The edge determination unit 71 supplies edge region information indicative of the edge region to the combination unit 73.

The smoothing unit 72 smooths an image pickup signal of a short-time accumulated pixel with a gain multiplied by the gain multiplication unit 51 and supplies the resultant signal to the combination unit 73.

The combination unit 73 extracts an image pickup signal of a short-time accumulated pixel in the edge region from the image pickup signal of the short-time accumulated pixel with a gain multiplied by the gain multiplication unit 51 on the basis of the edge region information supplied from the edge determination unit 71. Additionally, the combination unit 73 extracts an image pickup signal of a short-time accumulated pixel in other region than the edge region from the image pickup signal of the short-time accumulated pixel having been smoothed which is supplied from the smoothing unit 72 on the basis of the edge region information. The combination unit 73 combines the extracted image pickup signal of the short-time accumulated pixel in the edge region and the extracted image pickup signal of the short-time accumulated pixel in other region than the edge region. The combination unit 73 supplies the image pickup signals of the short-time accumulated pixels obtained as a result of the combination to the combination unit 16 in FIG. 1 as image pickup signals of both read intervals of the short-time accumulated pixels.

(Third Configuration Example of Image Generation Unit)

Figure 7:
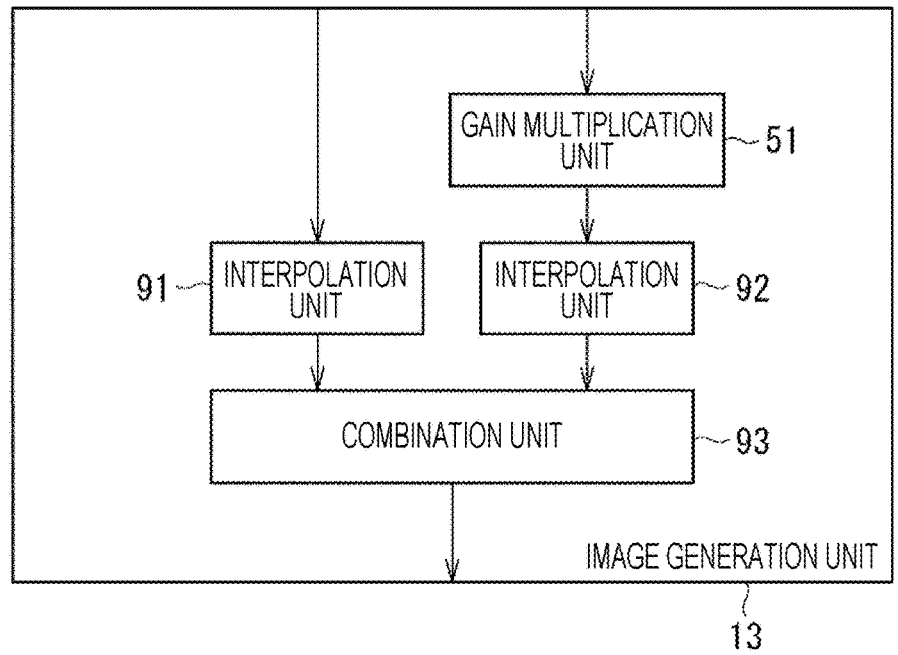
FIG. 7 is a block diagram showing a third configuration example of the image generation unit in FIG. 1.

FIG. 7 is a block diagram showing a third configuration example of the image generation unit 13 in FIG. 1.

In the configuration shown in FIG. 7, the same components as those of FIG. 5 are given the same reference codes. Overlapping description will be appropriately omitted.

The configuration of the image generation unit 13 in FIG. 7 differs from the configuration in FIG. 5 in that an interpolation unit 91, an interpolation unit 92, and a combination unit 93 are newly provided. The image generation unit 13 in FIG. 7 improves an SNR of image pickup signals of both read intervals by generating image pickup signals of the short read interval and image pickup signals of the long read interval of all the pixels by interpolation and combining the same at a ratio that makes the SNR maximum.

Specifically, the interpolation unit 91 of the image generation unit 13 conducts interpolation processing with respect to image pickup signals of long-time accumulated pixels supplied from the image sensor 11 in FIG. 1 to generate image pickup signals of the long read interval of all the pixels. The interpolation unit 91 supplies the generated image pickup signals of the long read interval of all the pixels to the combination unit 93.

The interpolation unit 92 conducts interpolation processing with respect to image pickup signals of short-time accumulated pixels with a gain multiplied by the gain multiplication unit 51 to generate image pickup signals of the short read interval of all the pixels. The interpolation unit 92 supplies the generated image pickup signals of the short read interval of all the pixels to the combination unit 93.

The combination unit 93 combines image pickup signals of the long read interval of all the pixels supplied from the interpolation unit 91 and image pickup signals of the short read interval of all the pixels supplied from the interpolation unit 92 at a ratio that makes the SNR maximum. Assuming a standard deviation of an image pickup signal of the short read interval to be $\sigma_S$ and a standard deviation of an image pickup signal of the long read interval to be $\sigma_L$, a ratio of the image pickup signals of the long read interval that makes the SNR maximum is $\sigma_S/(\sigma_S+\sigma_L)$, and a ratio of the image pickup signals of the short read interval is $\sigma_L/(\sigma_S+\sigma_L)$. The combination unit 93 supplies the image pickup signals of all the pixels obtained as a result of the combination to the combination unit 16 in FIG. 1 as image pickup signals of both read intervals.
(First Configuration Example of Combination Ratio Calculation Unit)

Figure 8:
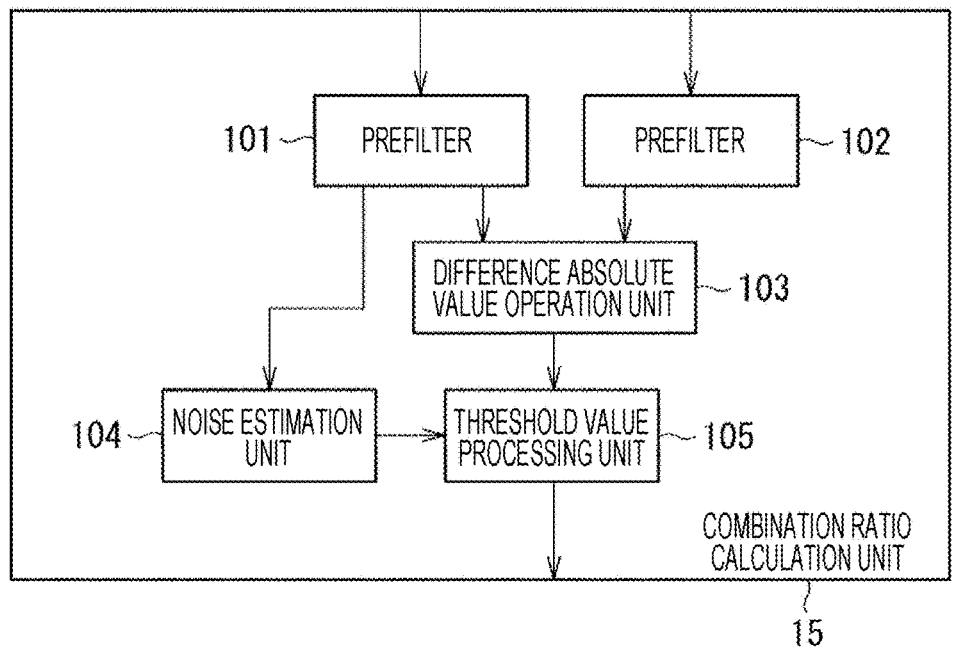
FIG. 8 is a block diagram showing a first configuration example of a combination ratio calculation unit in FIG. 1.

FIG. 8 is a block diagram showing a first configuration example of the combination ratio calculation unit 15 in FIG. 1.

The combination ratio calculation unit 15 in FIG. 8 is configured with a prefilter 101, a prefilter 102, a difference absolute value operation unit 103, a noise estimation unit 104, and a threshold value processing unit 105.

The prefilter 101 of the combination ratio calculation unit 15 conducts filtering processing with respect to an image pickup signal of a long-time accumulated pixel supplied from the image sensor 11 or the frame memory 12 in FIG. 1 in each vertical synchronization period. The filtering processing is processing of changing a position of each pixel of an image pickup signal to a reference position, as well as suppressing noise of the image pickup signal. The prefilter 101 supplies the image pickup signal of the long-time accumulated pixel subjected to the filtering processing to the difference absolute value operation unit 103 and the noise estimation unit 104.

The prefilter 102 conducts similar filtering processing to that of the prefilter 101 with respect to an image pickup signal of a short-time accumulated pixel supplied from the image sensor 11 in each vertical synchronization period. The prefilter 102 supplies the image pickup signal of the short-time accumulated pixel subjected to the filtering processing to the difference absolute value operation unit 103.

The difference absolute value operation unit 103 calculates an absolute value of a difference between an image pickup signal of a long-time accumulated pixel supplied from the prefilter 101 and an image pickup signal of a short-time accumulated pixel supplied from the prefilter 102 with respect to each reference position. The difference absolute value operation unit 103 supplies the difference absolute value of each reference position to the threshold value processing unit 105.

The noise estimation unit 104 estimates a standard deviation σ of an image pickup signal of a long-time accumulated pixel as a noise amount on the basis of an image pickup signal of a long-time accumulated pixel supplied from the prefilter 101 and supplies the same to the threshold value processing unit 105.

The threshold value processing unit 105 determines a threshold value for use in determination of a moving subject region on the basis of the standard deviation σ supplied as a noise amount from the noise estimation unit 104. For example, the threshold value processing unit 105 determines the standard deviation σ as a first threshold value. The threshold value processing unit 105 determines a moving subject region using a difference absolute value of each reference position supplied from the difference absolute value operation unit 103 and the first threshold value.

Specifically, the threshold value processing unit 105 determines whether the difference absolute value of each reference position is larger than the first threshold value or not. Then, when the difference absolute value is larger than the first threshold value, the threshold value processing unit 105 determines that a reference position corresponding to the difference absolute value is the moving subject region and when the difference absolute value is smaller than the first threshold value, determines that the reference position corresponding to the difference absolute value is not the moving subject region.

Specifically, when the difference absolute value is larger than the first threshold value, the threshold value processing unit 105 determines that the difference absolute value is caused not by noise but by movement. On the other hand, when the difference absolute value is not larger than the first threshold value, the threshold value processing unit 105 determines that the difference absolute value is caused by noise.

As described in the foregoing, since the threshold value processing unit 105 determines a moving subject region by using an image pickup signal with noise suppressed by the filtering processing by the prefilter 101 and the prefilter 102, determination precision is excellent.

The threshold value processing unit 105 sets a combination ratio of a pixel corresponding to a reference position determined as a moving subject region by a determination of a moving subject region such that a ratio of a short read interval image pickup signal is large. Additionally, the threshold value processing unit 105 sets a combination ratio of a pixel corresponding to a reference position determined not to be a moving subject region by a determination of a moving subject region such that a ratio of image pickup signals of both read intervals is large. The threshold value processing unit 105 supplies the set combination ratio of each pixel to the combination unit 16 in FIG. 1.

This makes an image pickup signal of a moving image in a region without a motion be heavily affected by an image pickup signal of a long-time accumulated pixel with less noise and makes an image pickup signal of a moving image in a region with a motion be heavily affected by an image pickup signal of a short-time accumulated pixel with less motion blur. As a result, the image processing apparatus 10 is allowed to output an image pickup signal of a high-quality moving image with less noise and motion blur.
(Description of Combination Ratio)

Figure 9:
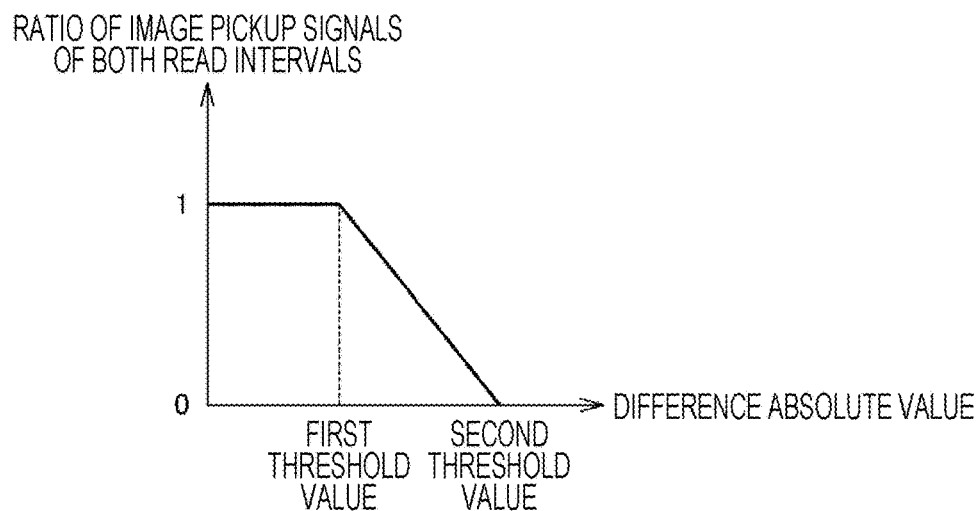
FIG. 9 is a diagram showing an example of a ratio of image pickup signals of both read intervals set by a threshold value processing unit in FIG. 8.

FIG. 9 is a diagram showing an example of a ratio of image pickup signals of both read intervals among combination ratios set by the threshold value processing unit 105 in FIG. 8.

In FIG. 9, a horizontal axis represents a difference absolute value calculated by the difference absolute value operation unit 103 in FIG. 8, and a vertical axis represents a ratio of image pickup signals of both read intervals.

As shown in FIG. 9, when a difference absolute value of a reference position is not more than the first threshold value and the reference position is determined not to be a moving subject region, the threshold value processing unit 105 sets a ratio of image pickup signals of both read intervals of a pixel corresponding to the reference position to be 1 as a maximum value, for example. On this occasion, a ratio of a short read interval image pickup signal is set to be 0 (=1−0).

By contrast, when the difference absolute value of the reference position is more than the first threshold value and the reference position is determined to be a moving subject region, the threshold value processing unit 105 sets, for example, a value three times the standard deviation σ as a second threshold value.

Then, when the difference absolute value of the reference position is more than the first threshold value and not more than the second threshold value, the threshold value processing unit 105 sets a ratio of image pickup signals of both read intervals of a pixel corresponding to the reference position according to a predetermined function. The predetermined function is a function proportional to a difference absolute value, which takes 1 when the difference absolute value is the first threshold value and takes 0 when the same is the second threshold value. On this occasion, the ratio of the short read interval image pickup signal is set to be a value obtained by subtracting the ratio of the image pickup signals of both read intervals from 1.

Additionally, when the difference absolute value of the reference position is more than the second threshold value, the threshold value processing unit 105 sets a ratio of image pickup signals of both read intervals of a pixel corresponding to the reference position to be 0 as a minimum value. On this occasion, a ratio of the short read interval image pickup signal is set to 1.

(Second Configuration Example of Combination Ratio Calculation Unit)

Figure 10:
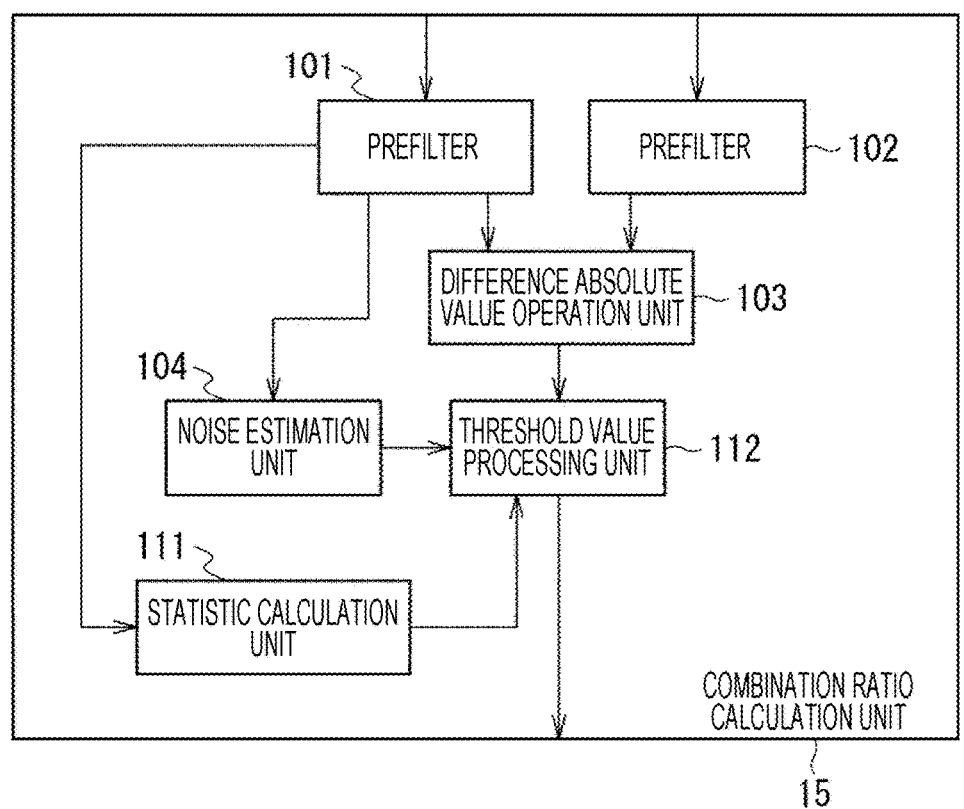
FIG. 10 is a block diagram showing a second configuration example of the combination ratio calculation unit in FIG. 1.

FIG. 10 is a block diagram showing a second configuration example of the combination ratio calculation unit 15 in FIG. 1.

In the configuration shown in FIG. 10, the same components as those of FIG. 8 are given the same reference codes. Overlapping description will be appropriately omitted.

The configuration of the combination ratio calculation unit 15 in FIG. 10 is different from the configuration in FIG. 8 in that a statistic calculation unit 111 is newly provided and that in place of the threshold value processing unit 105, a threshold value processing unit 112 is provided. The combination ratio calculation unit 15 in FIG. 10 sets a ratio of a short read interval image pickup signal to be a value larger than 0 even in a region not a moving subject region when a subject within a screen has an intricate texture.

The statistic calculation unit 111 of the combination ratio calculation unit 15 calculates such a statistic as a dispersion value of an image pickup signal of a long-time accumulated pixel subjected to the filtering processing which is output from the prefilter 101, and supplies the same to the threshold value processing unit 112.

Similarly to the threshold value processing unit 105 in FIG. 8, the threshold value processing unit 112 determines the first threshold value for use in determining a moving subject region on the basis of the standard deviation σ supplied from the noise estimation unit 104 as a noise amount. Similarly to the threshold value processing unit 105, the threshold value processing unit 112 determines a moving subject region by using a difference absolute value of each reference position supplied from the difference absolute value operation unit 103 and the first threshold value.

Similarly to the threshold value processing unit 105, by using the second threshold value, the threshold value processing unit 112 sets a combination ratio of a pixel corresponding to a reference position determined to be a moving subject region by the determination of a moving subject region such that a ratio of a short read interval image pickup signal is large.

Additionally, the threshold value processing unit 112 determines whether a texture of a subject in the screen is intricate or not on the basis of a dispersion value supplied from the statistic calculation unit 111. When the texture of the subject in the screen is determined to be intricate, the threshold value processing unit 112 sets a ratio of image pickup signals of both read intervals of a pixel corresponding to the reference position determined not to be a moving subject region by the determination of a moving subject region to be a value (e.g. 0.5) smaller than the maximum value. On this occasion, the ratio of the short read interval image pickup signal is set to be 0.5 (=1−0.5).

By contrast, when the texture of the subject in the screen is determined not to be intricate, the threshold value processing unit 112 sets a ratio of a short read interval image pickup signal of a pixel corresponding to the reference position determined not to be a moving subject region by the determination of a moving subject region to be 1 as the maximum value. On this occasion, a ratio of the short read interval image pickup signal is set to be 0.

From the foregoing, an image pickup signal of a moving image in a region without motion on the screen in which a texture of a subject is intricate will be affected both by an image pickup signal of a long-time accumulated pixel and an image pickup signal of a short-time accumulated pixel. As a result, the image processing apparatus 10 enables an image quality of an image pickup signal of a moving image to be improved.

(Description of Processing of Image Processing Apparatus)

Figure 11:
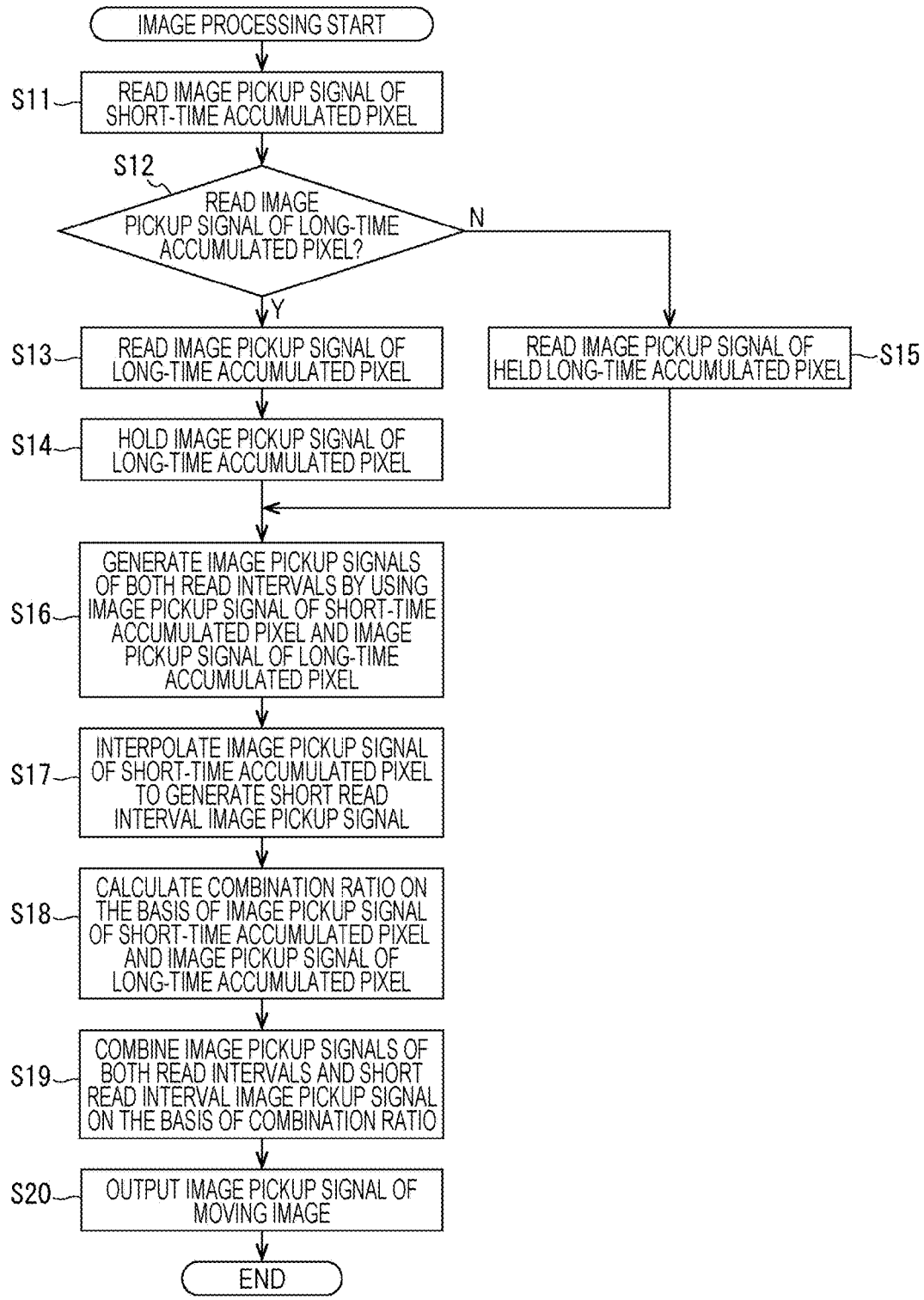
FIG. 11 is a flow chart for explaining image processing of the image processing apparatus in FIG. 1.

FIG. 11 is a flow chart for explaining image processing of the image processing apparatus 10 in FIG. 1. This image processing is conducted in each vertical synchronization period, for example.

At step S11 in FIG. 11, the image sensor 11 of the image processing apparatus 10 reads an image pickup signal of a short-time accumulated pixel and supplies the same to the image generation unit 13, the pixel interpolation unit 14, and the combination ratio calculation unit 15. Then, the image sensor 11 resets electric charges accumulated in the pixel 32 whose image pickup signal is read as a short-time accumulated pixel to cause the pixel 32 to start exposure again.

At step S12, the image sensor 11 determines whether to read or not an image pickup signal of a long-time accumulated pixel. For example, when a long read interval is a multiple of 2 of the vertical synchronization period, the image sensor 11 determines not to read an image pickup signal of a long-time accumulated pixel during a first vertical synchronization period out of two successive vertical synchronization periods and determines to read an image pickup signal of a long-time accumulated pixel during the last vertical synchronization period.

When it is determined to read an image pickup signal of a long-time accumulated pixel at step S12, the image sensor 11 reads an image pickup signal of a long-time accumulated pixel and supplies the same to the frame memory 12, the image generation unit 13, and the combination ratio calculation unit 15 at step S13. Then, the image sensor 11 resets electric charges accumulated in the pixel 32 whose image pickup signal is read as a long-time accumulated pixel to cause the pixel 32 to start exposure again.

At step S14, the frame memory 12 holds an image pickup signal of a long-time accumulated pixel supplied from the image sensor 11 and advances the processing to step S16.

By contrast, when it is determined not to read an image pickup signal of a long-time accumulated pixel at step S12, the image generation unit 13 and the combination ratio calculation unit 15 read an image pickup signal of a long-time accumulated pixel held in the frame memory 12 at step S15 to advance the processing to step S16.

At step S16, the image generation unit 13 generates image pickup signals of both read intervals by using the image pickup signal of the short-time accumulated pixel supplied from the image sensor 11 and the image pickup signal of the long-time accumulated pixel supplied from the image sensor 11 or the frame memory 12 and supplies the same to the combination unit 16.

At step S17, the pixel interpolation unit 14 interpolates the image pickup signal of the short-time accumulated pixel supplied from the image sensor 11 to generate a short read interval image pickup signal and supplies the generated signal to the combination unit 16.

At step S18, the combination ratio calculation unit 15 calculates a combination ratio of the image pickup signals of both read intervals to the short read interval image pickup signals on the basis of the image pickup signal of the short-time accumulated pixel supplied from the image sensor 11 and the image pickup signal of the long-time accumulated pixel supplied from the image sensor 11 or the frame memory 12. The combination ratio calculation unit 15 supplies the calculated combination ratio to the combination unit 16.

At step S19, the combination unit 16 combines the image pickup signals of both read intervals supplied from the image generation unit 13 and the short read interval image pickup signal supplied from the pixel interpolation unit 14 on the basis of the combination ratio supplied from the combination ratio calculation unit 15. At step S20, the combination unit 16 outputs an image pickup signal obtained as a result of the combination as an image pickup signal of a moving image to end the processing.

As described in the foregoing, the image processing apparatus 10 includes the image sensor 11 having short-time accumulated pixels and long-time accumulated pixels, and the frame memory 12 which holds an image pickup signal of a long-time accumulated pixel. Accordingly, the image processing apparatus 10 is allowed to photograph a moving image with an exposure length as a multiple of 2 or more of the vertical synchronization period. It is therefore possible to improve an SNR of a dark place in an image pickup signal of a moving image. Additionally, since the image sensor 11 of the image processing apparatus 10 has short-time accumulated pixels, an image pickup signal of a moving image can be updated in each vertical synchronization period.

<Second Embodiment>
(Configuration Example of Second Embodiment of Image Processing Apparatus)

Figure 12:
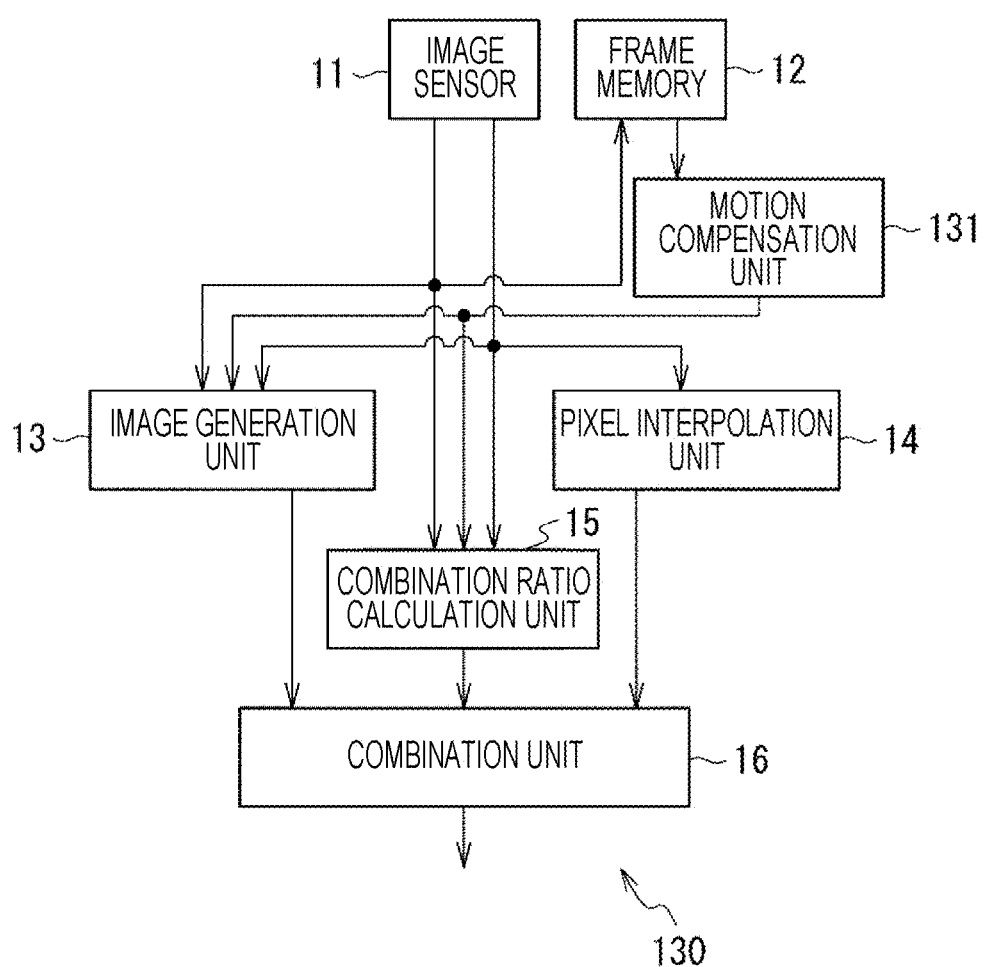
FIG. 12 is a block diagram showing a configuration example of a second embodiment of an image processing apparatus to which the present disclosure is applied.

FIG. 12 is a block diagram showing a configuration example of a second embodiment of an image processing apparatus to which the present disclosure is applied.

In the configuration shown in FIG. 12, the same components as those of FIG. 1 are given the same reference codes. Overlapping description will be appropriately omitted.

A configuration of an image processing apparatus 130 in FIG. 12 is different from the configuration of the image processing apparatus 10 in FIG. 1 in that a motion compensation unit 131 is newly provided. The image processing apparatus 130 conducts motion compensation of compensating a spatial phase deviation of an image pickup signal of a long-time accumulated pixel read from the frame memory 12.

Specifically, to the motion compensation unit 131 of the image processing apparatus 130, the image pickup signal of the long-time accumulated pixel read from the frame memory 12 is supplied. The motion compensation unit 131 conducts motion compensation of the image pickup signal of the long-time accumulated pixel on the basis of a signal indicative of a motion of the image sensor 11 at exposure time which is measured by a gyro sensor not shown or the like.

In more detail, the motion compensation unit 131 estimates a shake amount in an image pickup signal of a long-time accumulated pixel. The motion compensation unit 131 conducts such conversion as translation, rotation, affine transformation or projective transformation with respect to an image pickup signal of a long-time accumulated pixel supplied from the frame memory 12 so as to correct an estimated shake amount. This changes a spatial phase of the image pickup signal of the long-time accumulated pixel supplied from the frame memory 12 to an actual spatial phase as of when the image pickup signal is read. The motion compensation unit 131 supplies the image pickup signal of the long-time accumulated pixel subjected to motion compensation to the image generation unit 13 and the combination ratio calculation unit 15.

Since image processing of the image processing apparatus 130 is similar to the image processing in FIG. 11, except that motion compensation is conducted by the motion compensation unit 131 between step S15 and step S16, description thereof will be omitted.

Note that the motion compensation unit 131 may compensate a spatial phase deviation using not a signal indicative of a motion of the image sensor 11 measured by a gyro sensor or the like but a motion vector detected on the basis of image pickup signals of long-time accumulated pixels in a plurality of past frames.

<Third Embodiment>
(Configuration Example of Third Embodiment of Image Processing Apparatus)

Figure 13:
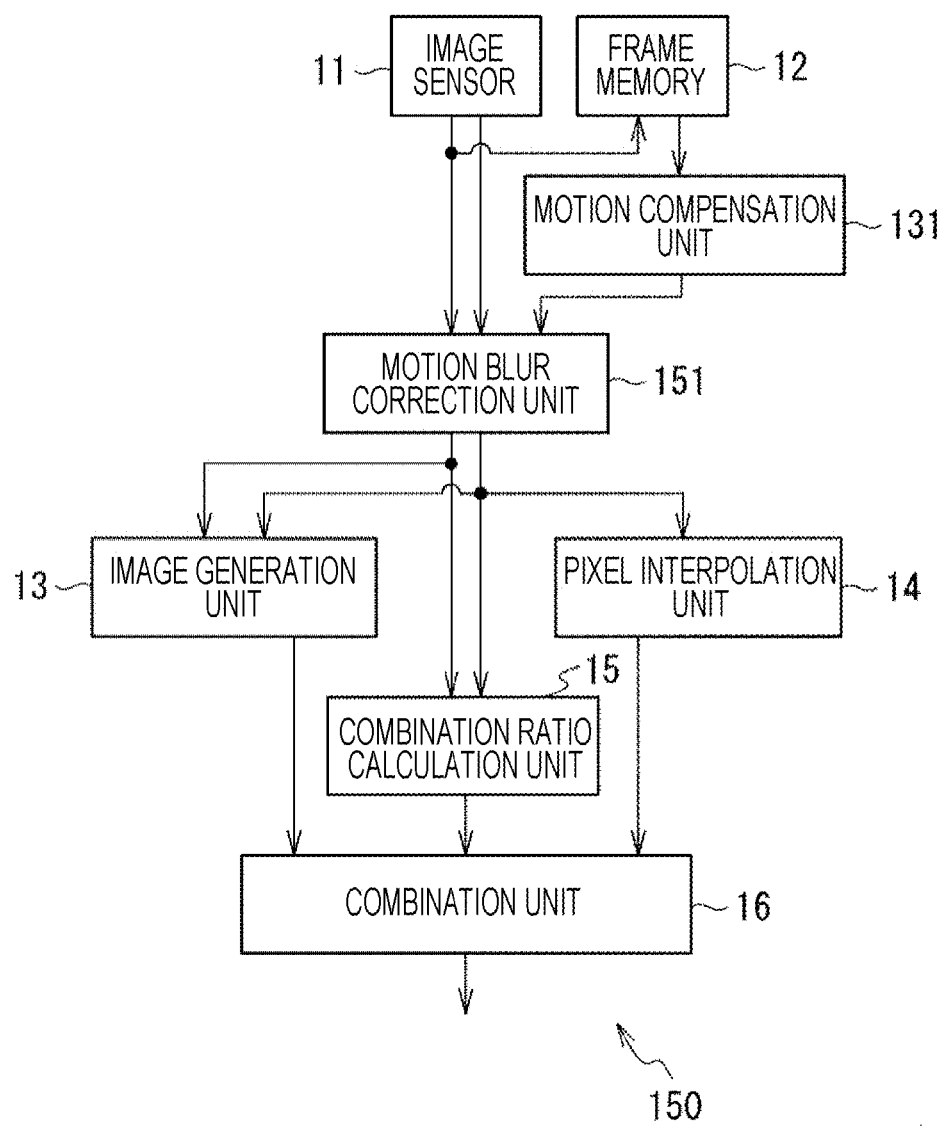
FIG. 13 is a block diagram showing a configuration example of a third embodiment of an image processing apparatus to which the present disclosure is applied.

FIG. 13 is a block diagram showing a configuration example of a third embodiment of an image processing apparatus to which the present disclosure is applied.

In the configuration shown in FIG. 13, the same components as those of FIG. 12 are given the same reference codes. Overlapping description will be appropriately omitted.

A configuration of an image processing apparatus 150 in FIG. 13 is different from the configuration of the image processing apparatus 130 in FIG. 12 in that a motion blur correction unit 151 is newly provided. The image processing apparatus 150 corrects a motion blur of image pickup signals of a short-time accumulated pixel and a long-time accumulated pixel caused by a motion of the image sensor 11.

Specifically, the motion blur correction unit 151 of the image processing apparatus 150 estimates a motion blur point spread function (PSF) on the basis of a signal indicative of a motion of the image sensor 11 at exposure time which is measured by a gyro sensor not shown. The motion blur correction unit 151 conducts motion blur correction with respect to an image pickup signal of a long-time accumulated pixel and an image pickup signal of a short-time accumulated pixel supplied from the image sensor 11 and an image pickup signal of a long-time accumulated pixel supplied from the motion compensation unit 13 by using the motion blur PSF. Motion blur correction methods include a method of superimposing inverse transformation of a motion blur kernel, applying a high pass filter (HPF) according to a direction of a blur, and the like.

The motion blur correction unit 151 supplies an image pickup signal of a long-time accumulated pixel subjected to motion blur correction to the image generation unit 13 and the combination ratio calculation unit 15. Additionally, the motion blur correction unit 151 supplies an image pickup signal of a short-time accumulated pixel subjected to motion blur correction to the image generation unit 13, the pixel interpolation unit 14, and the combination ratio calculation unit 15.

Since the image processing of the image processing apparatus 150 is similar to the image processing of the image processing apparatus 130 in FIG. 12, except that motion blur correction is conducted by the motion blur correction unit 151 between step S14 and step S15, and step S16, description thereof will be omitted.

<Fourth Embodiment>
(Configuration Example of Fourth Embodiment of Image Processing Apparatus)

Figure 14:
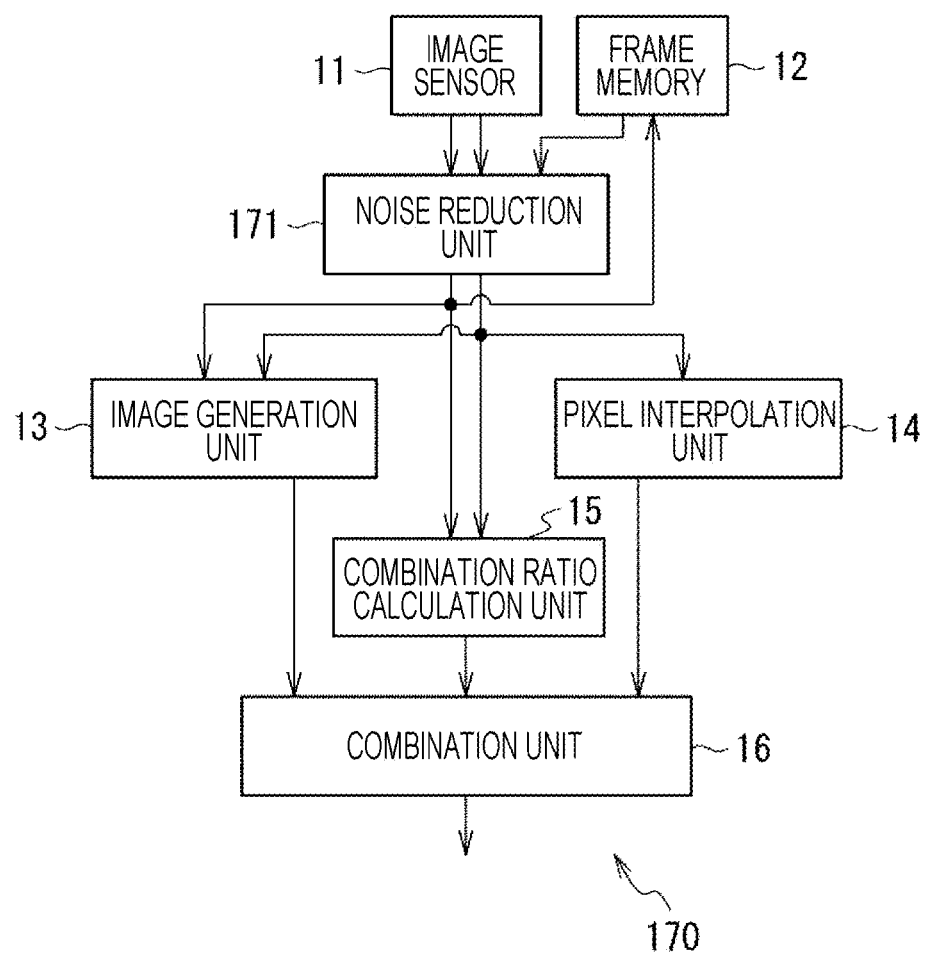
FIG. 14 is a block diagram showing a configuration example of a fourth embodiment of an image processing apparatus to which the present disclosure is applied.

FIG. 14 is a block diagram showing a configuration example of a fourth embodiment of an image processing apparatus to which the present disclosure is applied.

In the configuration shown in FIG. 14, the same components as those of FIG. 1 are given the same reference codes. Overlapping description will be appropriately omitted.

A configuration of an image processing apparatus 170 in FIG. 14 is different from the configuration of the image processing apparatus 10 in FIG. 1 in that a noise reduction unit 171 is newly provided. With respect to image pickup signals of a long-time accumulated pixel and a short-time accumulated pixel, the image processing apparatus 170 conducts noise reduction with intensities different from each other.

Specifically, with respect to each of image pickup signals of a long-time accumulated pixel and a short-time accumulated pixel supplied from the image sensor 11 or the frame memory 12, the noise reduction unit 171 of the image processing apparatus 170 conducts noise reduction with intensities different from each other by using a low pass filter (LPF) or a nonlinear smoothing method. A difference in a noise reduction intensity between image pickup signals of a long-time accumulated pixel and a short-time accumulated pixel is determined on the basis of a difference in an exposure length in a long-time accumulated pixel and a short-time accumulated pixel, a difference in a gain multiplied by the gain multiplication unit 51, etc. This enables compensation of a difference in a noise intensity caused by a difference in an exposure length in a long-time accumulated pixel and a short-time accumulated pixel and by a difference in a gain multiplied by the gain multiplication unit 51.

To the frame memory 12, the noise reduction unit 171 supplies an image pickup signal of a long-time accumulated pixel subjected to noise reduction so as to be held, as well as supplying the image pickup signal to the image generation unit 13 and the combination ratio calculation unit 15. Additionally, the noise reduction unit 171 supplies an image pickup signal of a short-time accumulated pixel subjected to noise reduction to the image generation unit 13, the pixel interpolation unit 14 and combination ratio calculation unit 15.

Image processing of the image processing apparatus 170 is similar to the image processing in FIG. 11 except for the following points. Specifically, the image processing of the image processing apparatus 170 is different from the image processing in FIG. 11 in that noise reduction is conducted with respect to an image pickup signal of a short-time accumulated pixel by the noise reduction unit 171 between steps S11 and S12. Additionally, the image processing of the image processing apparatus 170 is different from the image processing in FIG. 11 in that noise reduction is conducted with respect to an image pickup signal of a long-time accumulated pixel by the noise reduction unit 171 between steps S13 and S14 and between steps S15 and S16.

Note that the noise reduction unit 171 may conduct noise reduction with the same intensity with respect to both image pickup signals of a long-time accumulated pixel and a short-time accumulated pixel <Fifth Embodiment>
(Configuration Example of Fifth Embodiment of Image Processing Apparatus)

Figure 15:
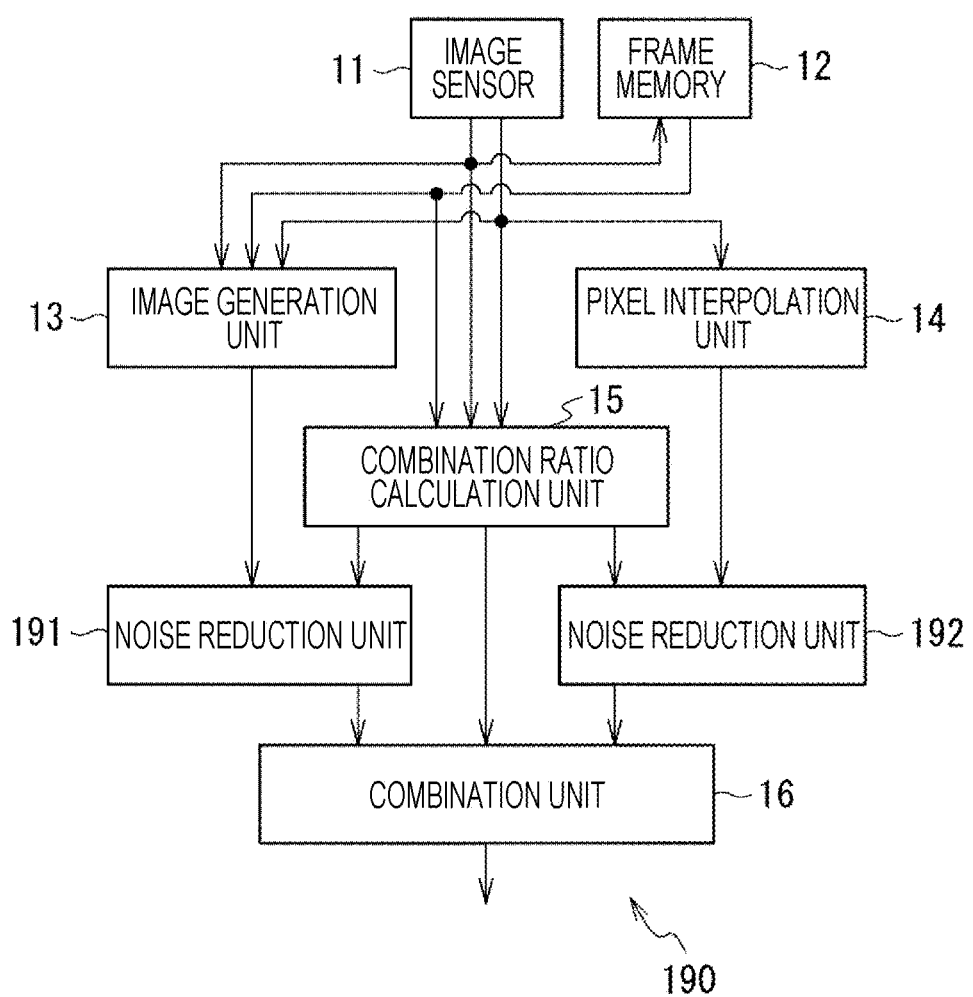
FIG. 15 is a block diagram showing a configuration example of a fifth embodiment of an image processing apparatus to which the present disclosure is applied.

FIG. 15 is a block diagram showing a configuration example of a fifth embodiment of an image processing apparatus to which the present disclosure is applied.

In the configuration shown in FIG. 15, the same components as those of FIG. 1 are given the same reference codes. Overlapping description will be appropriately omitted.

A configuration of an image processing apparatus 190 in FIG. 15 is different from the configuration of the image processing apparatus 10 in FIG. 1 in that a noise reduction unit 191 and a noise reduction unit 192 are newly provided. The image processing apparatus 190 conducts noise reduction with respect to image pickup signals of both read intervals and a short read interval image pickup signal.

Specifically, the noise reduction unit 191 of the image processing apparatus 190 determines an intensity of noise reduction on the basis of a combination ratio calculated by the combination ratio calculation unit 15, a difference in an exposure length in a long-time accumulated pixel and a short-time accumulated pixel, a difference in a gain multiplied by the gain multiplication unit 51, etc.

Specifically, when image pickup signals of both read intervals and a short-time accumulated image pickup signal are combined, there is a case where making frequency characteristics of both signals be coincident leads to improvement in an image quality of a combination result. Accordingly, when a combination ratio of image pickup signals of both read intervals is, for example, 0 or 1, i.e. no combination is conducted, the noise reduction unit 191 increases an intensity of noise reduction and when the combination ratio of image pickup signals of both read intervals is larger than 0 and less than 1, reduces the intensity of the noise reduction.

With respect to image pickup signals of both read intervals generated by the image generation unit 13, the noise reduction unit 191 (both read interval noise reduction unit) conducts noise reduction with the determined intensity using LPF or a nonlinear smoothing method. The noise reduction unit 191 supplies the image pickup signals of both read intervals subjected to noise reduction to the combination unit 16.

The noise reduction unit 192 determines an intensity of noise reduction on the basis of a combination ratio calculated by the combination ratio calculation unit 15, a difference in an exposure length between a long-time accumulated pixel and a short-time accumulated pixel, a difference in a gain multiplied by the gain multiplication unit 51, or the like, similarly to the noise reduction unit 191. With respect to a short read interval image pickup signal generated by the pixel interpolation unit 14, the noise reduction unit 192 (short read interval noise reduction unit) conducts noise reduction with the determined intensity using LPF or a nonlinear smoothing method. The noise reduction unit 192 supplies the short read interval image pickup signal subjected to noise reduction to the combination unit 16.

As described in the foregoing, the noise reduction unit 191 and the noise reduction unit 192 determine an intensity of noise reduction on the basis of a combination ratio, a difference in an exposure length between a long-time accumulated pixel and a short-time accumulated pixel, a difference in a gain multiplied by the gain multiplication unit 51, or the like. Accordingly, the noise reduction unit 191 and the noise reduction unit 192 are allowed to compensate a difference in a noise intensity caused by a combination ratio, a difference in an exposure length between a long-time accumulated pixel and a short-time accumulated pixel, a difference in a gain multiplied by the gain multiplication unit 51.

Since image processing of the image processing apparatus 190 is similar to the image processing in FIG. 11, except that between steps S17 and S18, noise reduction is conducted by the noise reduction unit 191 and the noise reduction unit 192, no description will be made thereof.

Note that the noise reduction unit 191 and the noise reduction unit 192 may conduct noise reduction with a plurality of noise intensities irrespective of a combination ratio, and the combination unit 16 may select and combine an image pickup signal subjected to noise reduction with a noise intensity corresponding to a combination ratio.

Additionally, the image processing apparatus 190 may include the noise reduction unit 171. Additionally, the noise reduction unit 191 and the noise reduction unit 192 may conduct noise reduction with the same intensity.

<Sixth Embodiment>
(Configuration Example of Sixth Embodiment of Image Processing Apparatus)

Figure 16:
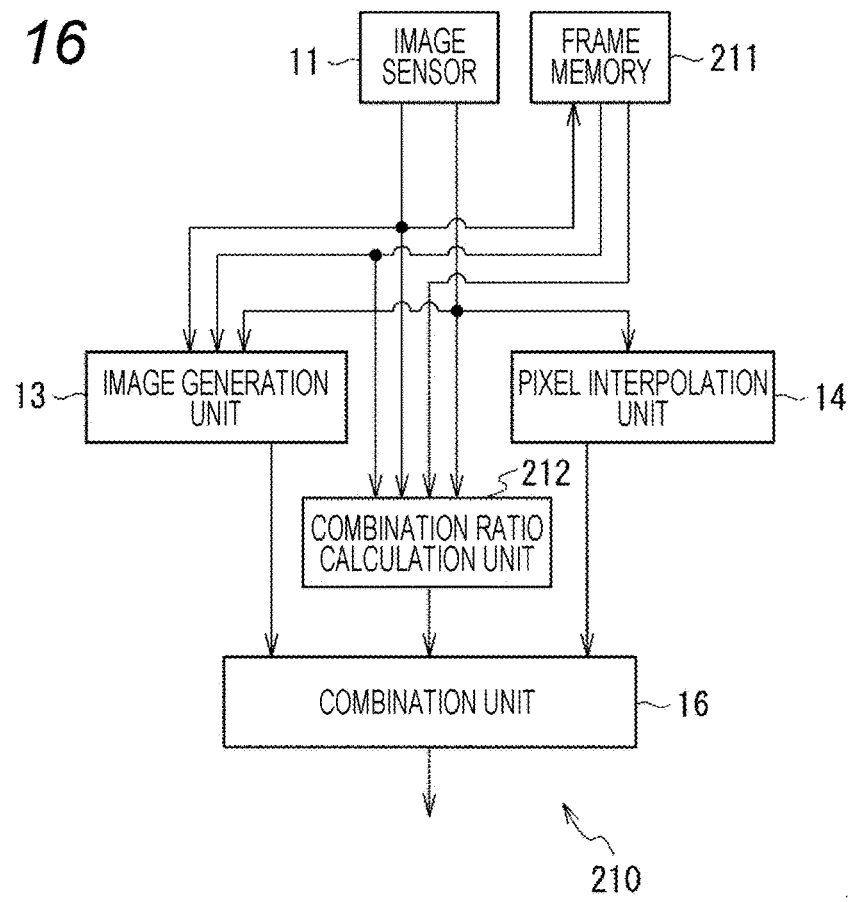
FIG. 16 is a block diagram showing a configuration example of a sixth embodiment of an image processing apparatus to which the present disclosure is applied.

FIG. 16 is a block diagram showing a configuration example of a sixth embodiment of an image processing apparatus to which the present disclosure is applied.

In the configuration shown in FIG. 16, the same components as those of FIG. 1 are given the same reference codes. Overlapping description will be appropriately omitted.

A configuration of an image processing apparatus 210 in FIG. 16 is different from the configuration of the image processing apparatus 10 in FIG. 1 in that in place of the frame memory 12 and the combination ratio calculation unit 15, a frame memory 211 and a combination ratio calculation unit 212 are provided. The image processing apparatus 210 calculates a combination ratio using not only image pickup signals of a long-time accumulated pixel and a short-time accumulated pixel for use in generation of image pickup signals of both read intervals and a short read interval image pickup signal to be combined but also an image pickup signal at time prior to these image pickup signals.

Specifically, the frame memory 211 of the image processing apparatus 210 holds image pickup signals, corresponding to two screens, of long-time accumulated pixels supplied from the image sensor 11 on a group basis.

The combination ratio calculation unit 212 reads, in each vertical synchronization period, an image pickup signal held in the frame memory 12, the image pickup signal (hereinafter, referred to as an image pickup signal of a past long-time accumulated pixel) being immediately before an image pickup signal of a long-time accumulated pixel for use in generation of image pickup signals of both read intervals to be combined and being of the same long-time accumulated pixel.

Additionally, when no image pickup signal of a long-time accumulated pixel is supplied from the image sensor 11, the combination ratio calculation unit 212 reads, from the frame memory 12, an image pickup signal which is for use in generation of image pickup signals of both read intervals to be combined and which has been read immediately before at the long read interval from the same long-time accumulated pixel.

In each vertical synchronization period, the combination ratio calculation unit 212 calculates a combination ratio of image pickup signals of both read intervals to a short read interval image pickup signal on the basis of an image pickup signal of a past long-time accumulated pixel, an image pickup signal of a long-time accumulated pixel supplied from the image sensor 11 or the frame memory 12, and an image pickup signal of a short-time accumulated pixel supplied from the image sensor 11. The combination ratio calculation unit 212 supplies the calculated combination ratio to the combination unit 16.

(Description of First Example of Image Pickup Signal of Past Long-Time Accumulated Pixel)

Figure 17:
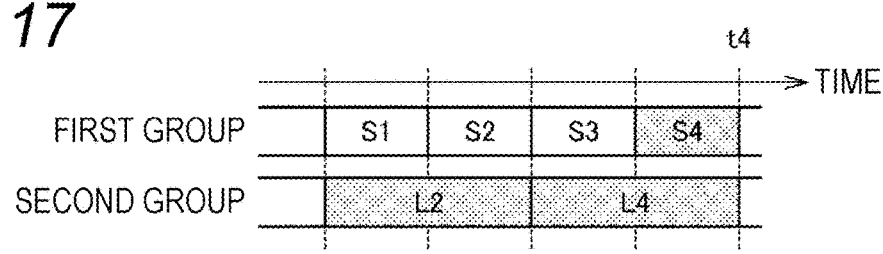
FIG. 17 is a diagram for explaining a first example of an image pickup signal of a past long-time accumulated pixel.

FIG. 17 is a diagram for explaining a first example of an image pickup signal of a past long-time accumulated pixel.

In the example in FIG. 17, a read interval for the pixels 32 in the first and second groups is a read interval for A of FIG. 4.

In this case, as shown in FIG. 17, from the pixels 32 in the first group, an image pickup signal of a short-time accumulated pixel is read in each vertical synchronization period. Additionally, from the pixels 32 in the second group, an image pickup signal of a long-time accumulated pixel is read at each long read interval which is a multiple of 2 of the vertical synchronization period.

Accordingly, for example, at time t4 when an image pickup signal S4 of a short-time accumulated pixel is read from the pixels 32 in the first group, an image pickup signal of a past long-time accumulated pixel will be an image pickup signal L2 of the same long-time accumulated pixel as that of an immediately preceding image pickup signal L4 of a long-time accumulated pixel read at the time. On this occasion, image pickup signals of both read intervals are generated using the image pickup signal S4 of the short-time accumulated pixel and the image pickup signal L4 of the long-time accumulated pixel.

(Description of Second Example of Image Pickup Signal of Past Long-Time Accumulated Pixel)

Figure 18:
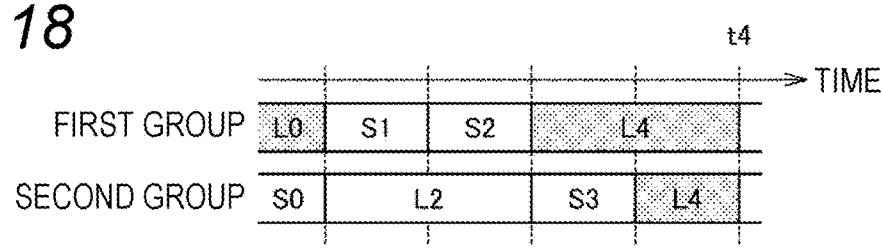
FIG. 18 is a diagram for explaining a second example of an image pickup signal of a past long-time accumulated pixel.

FIG. 18 is a diagram for explaining a second example of an image pickup signal of a past long-time accumulated pixel.

In the example in FIG. 18, a read interval for the pixels 32 in the first and second groups is a read interval for D of FIG. 4.

In this case, as shown in FIG. 18, while the pixels 32 of either one of the first group and second group become short-time accumulated pixels twice in succession, the pixels 32 of the other become long-time accumulated pixels once, and the one and the other of the first and second groups alternate with each other.

Accordingly, for example, at time t4 when the image pickup signal S4 of a short-time accumulated pixel is read from the pixels 32 in the second group, an image pickup signal of a past long-time accumulated pixel will be an image pickup signal L0 of the same long-time accumulated pixel as that of the immediately preceding image pickup signal L4 of a long-time accumulated pixel read from the pixels 32 in the second group at the time. On this occasion, image pickup signals of both read intervals are generated using the image pickup signal S4 of the short-time accumulated pixel and the image pickup signal L4 of the long-time accumulated pixel.

(Configuration Example of Combination Ratio Calculation Unit)

Figure 19:
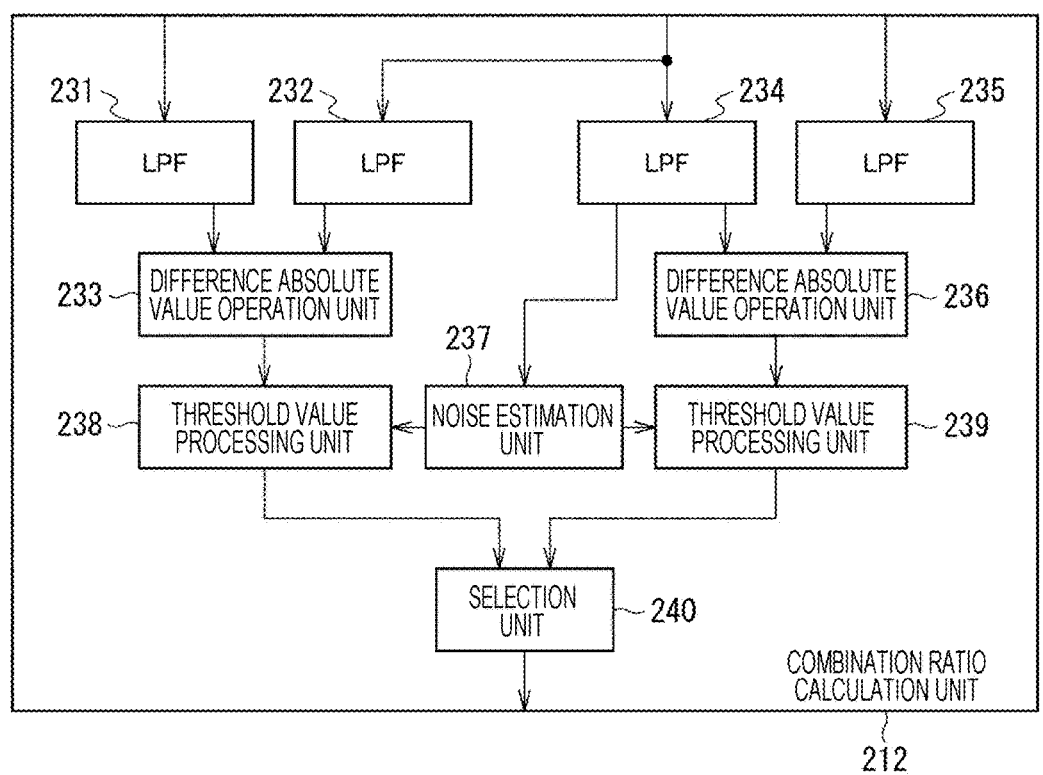
FIG. 19 is a block diagram showing a configuration example of a combination ratio calculation unit in FIG. 16.

FIG. 19 is a block diagram showing a configuration example of a combination ratio calculation unit 212 in FIG. 16.

The combination ratio calculation unit 212 in FIG. 19 is configured with low pass filters (LPF) 231 and 232, a difference absolute value operation unit 233, LPFs 234 and 235, a difference absolute value operation unit 236, a noise estimation unit 237, threshold value processing units 238 and 239, and a selection unit 240.

The LPF 231 of the combination ratio calculation unit 212 conducts noise reduction with respect to an image pickup signal of a past long-time accumulated pixel read from the frame memory 211 in FIG. 16 and supplies the same to the difference absolute value operation unit 233.

The LPF 232 conducts noise reduction with respect to an image pickup signal of a long-time accumulated pixel, which is supplied from the image sensor 11 or the frame memory 211, for use in generation of image pickup signals of both read intervals to be combined and supplies the obtained signal to the difference absolute value operation unit 233.

For each long-time accumulated pixel, the difference absolute value operation unit 233 calculates an absolute value of a difference between an image pickup signal of a long-time accumulated pixel supplied from the LPF 231 and an image pickup signal of a past long-time accumulated pixel supplied from the LPF 232 and supplies the obtained value to the threshold value processing unit 238.

The LPF 234 conducts noise reduction with a higher intensity as compared with that of the LPF 231 and the LPF 232 with respect to an image pickup signal of a long-time accumulated pixel, which is supplied from the image sensor 11 or the frame memory 211, for use in generation of image pickup signals of both read intervals to be combined, as well as changing a position of each long-time accumulated pixel to the reference position. The LPF 234 supplies a resultantly obtained image pickup signal of a long-time accumulated pixel belonging to a band lower than that of the image pickup signal of the long-time accumulated pixel output from the LPF 232 to the difference absolute value operation unit 236 and the noise estimation unit 237.

LPF 235 conducts noise reduction with a higher intensity as compared with that of the LPF 231 and the LPF 232 with respect to an image pickup signal of a short-time accumulated pixel supplied from the image sensor 11, as well as changing a position of each short-time accumulated pixel to the reference position. The LPF 235 supplies a resultantly obtained image pickup signal of a short-time accumulated pixel belonging to a band lower than that of the image pickup signal of the long-time accumulated pixel output from the LPF 232 to the difference absolute value operation unit 236.

For each reference position, the difference absolute value operation unit 236 calculates an absolute value of a difference between an image pickup signal of a long-time accumulated pixel supplied from the LPF 234 and an image pickup signal of a short-time accumulated pixel supplied from the LPF 235 and supplies the obtained value to the threshold value processing unit 239.

The noise estimation unit 237 estimates the standard deviation σ of an image pickup signal of a long-time accumulated pixel as a noise amount on the basis of an image pickup signal of a long-time accumulated pixel supplied from the LPF 234 and supplies the obtained value to the threshold value processing unit 238 and the threshold value processing unit 239.

The threshold value processing unit 238 determines, for example, the standard deviation σ as the first threshold value for use in determination of a moving subject region on the basis of the standard deviation σ supplied as a noise amount from the noise estimation unit 237. The threshold value processing unit 238 determines a moving subject region by using a difference absolute value of each long-time accumulated pixel supplied from the difference absolute value operation unit 233 and the first threshold value.

Specifically, the threshold value processing unit 238 determines whether a difference absolute value of each long-time accumulated pixel is larger than the first threshold value or not. Then, when the difference absolute value is larger than the first threshold value, the threshold value processing unit 238 determines that a long-time accumulated pixel corresponding to the difference absolute value is a moving subject region, and when the difference absolute value is smaller than the first threshold value, determines that the long-time accumulated pixel corresponding to the difference absolute value is not a moving subject region.

The threshold value processing unit 238 sets a combination ratio of a pixel corresponding to a long-time accumulated pixel determined to be a moving subject region by the determination of a moving subject region such that a ratio of a short read interval image pickup signal is large. Additionally, the threshold value processing unit 238 sets a combination ratio of a pixel corresponding to a long-time accumulated pixel determined not to be a moving subject region by the determination of a moving subject region such that a ratio of image pickup signals of both read intervals is large. The threshold value processing unit 238 supplies the set combination ratio of each pixel to the selection unit 240.

Similarly to the threshold value processing unit 238, the threshold value processing unit 239 determines the first threshold value for use in determining a moving subject region on the basis of the standard deviation σ supplied from the noise estimation unit 237 as a noise amount. Similarly to the threshold value processing unit 238, the threshold value processing unit 239 determines a moving subject region by using a difference absolute value of each reference position supplied from the difference absolute value operation unit 236 and the first threshold value.

The threshold value processing unit 238 sets a combination ratio of a pixel corresponding to a reference position determined to be a moving subject region by the determination of a moving subject region such that a ratio of a short read interval image pickup signal is large. Additionally, the threshold value processing unit 239 sets a combination ratio of a pixel corresponding to a reference position determined not to be a moving subject region by the determination of a moving subject region such that a ratio of image pickup signals of both read intervals is large. The threshold value processing unit 239 supplies the set combination ratio of each pixel to the selection unit 240.

The selection unit 240 selects a combination ratio having a smaller time change, of a combination ratio supplied from the threshold value processing unit 238 or a combination ratio supplied rom the threshold value processing unit 239. This makes a combination ratio stable. The selection unit 240 supplies the selected combination ratio to the combination unit 16 in FIG. 16.

As described in the foregoing, the combination ratio calculation unit 212 determines a moving subject region on the basis of image pickup signals of the same long-time accumulated pixel. Accordingly, compensating position deviations of a long-time accumulated pixel and a short-time accumulated pixel prevents reduction in determination precision of a moving subject region.

Specifically, positions of the long-time accumulated pixels and the short-time accumulated pixels on the pixel array unit 31 are different from each other. Accordingly, when an absolute value of a difference is obtained between an image pickup signal of a long-time accumulated pixel and an image pickup signal of a short-time accumulated pixel, a position of each pixel is changed to the reference position, which makes a difference absolute value large in a region in the vicinity of an edge, even in a stationary subject region, so that the region might be determined as a moving subject region. By contrast, since the combination ratio calculation unit 212 obtains an absolute value of a difference between image pickup signals of the same long-time accumulated pixel, no position change of the pixel of the image pickup signal is required, thereby enabling determination of a moving subject with high precision.

Additionally, since a noise amount of an image pickup signal of a long-time accumulated pixel is smaller than that of an image pickup signal of a short-time accumulated pixel, determination of a moving subject region only based on an image pickup signal of a long-time accumulated pixel enables a determination precision to be increased.

Image processing of the image processing apparatus 210 in FIG. 16 is similar to the image processing in FIG. 11, except that between steps S17 and S18, an image pickup signal of a past long-time accumulated pixel is read and that at step S18, an image pickup signal of a past long-time accumulated pixel is also used for calculation of a combination ratio. Accordingly, description thereof is omitted.

<Seventh Embodiment>
(Configuration Example of Seventh Embodiment of Image Processing Apparatus)

Figure 20:
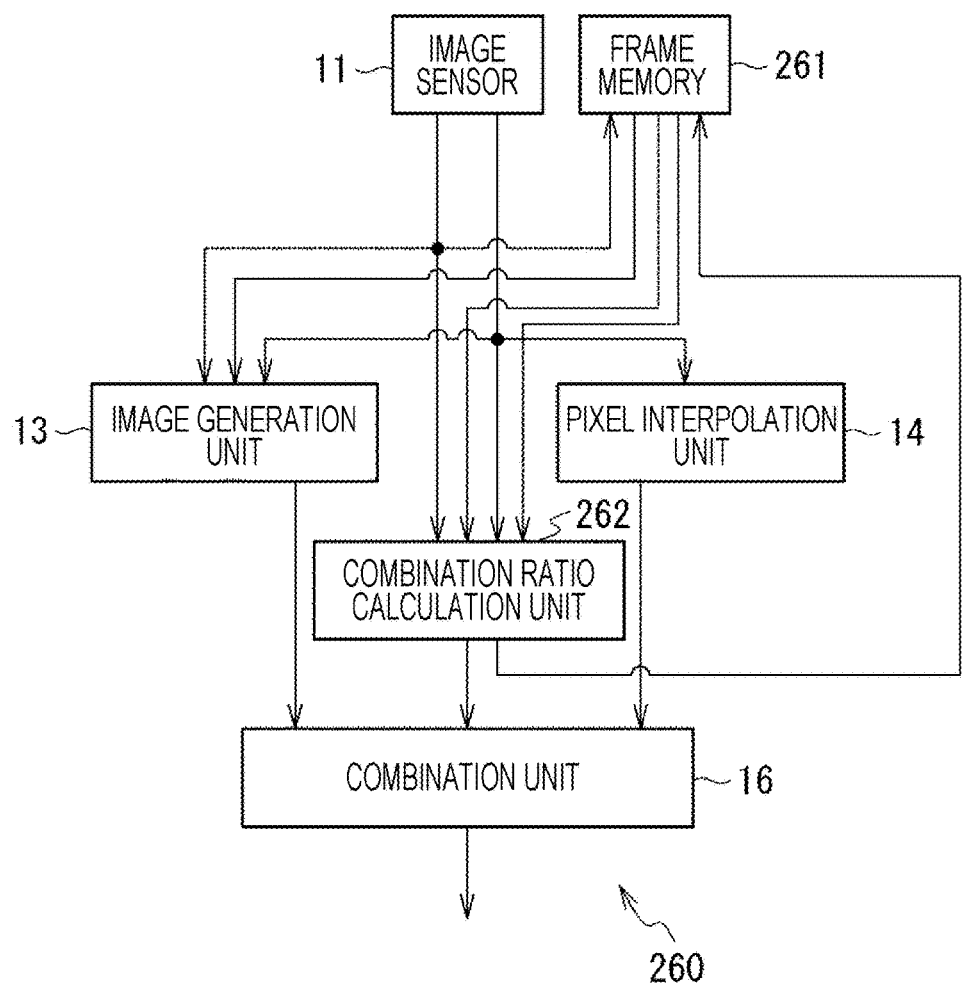
FIG. 20 is a block diagram showing a configuration example of a seventh embodiment of an image processing apparatus to which the present disclosure is applied.

FIG. 20 is a block diagram showing a configuration example of a seventh embodiment of an image processing apparatus to which the present disclosure is applied.

In the configuration shown in FIG. 20, the same components as those of FIG. 1 are given the same reference codes. Overlapping description will be appropriately omitted.

A configuration of an image processing apparatus 260 in FIG. 20 is different from the configuration of the image processing apparatus 10 in FIG. 1 in that in place of the frame memory 12 and the combination ratio calculation unit 15, a frame memory 261 and a combination ratio calculation unit 262 are provided. The image processing apparatus 260 holds a combination ratio determined on the basis of image pickup signals of long-time accumulated pixels (hereinafter, referred to as a long-time accumulation combination ratio) in the frame memory 261 and uses the same for the selection of a combination ratio when no image pickup signal of a long-time accumulated pixel is read from the image sensor 11.

Specifically, on a group basis, the frame memory 261 of the image processing apparatus 260 holds image pickup signals, corresponding to two screens, of long-time accumulated pixels supplied from the image sensor 11. Additionally, on a group basis, the frame memory 261 holds a long-time accumulation combination ratio, corresponding to one screen, which is supplied from the combination ratio calculation unit 262.

When in each long read interval, an image pickup signal of a long-time accumulated pixel is supplied from the image sensor 11, the combination ratio calculation unit 262 reads an image pickup signal of a past long-time accumulated pixel held in the frame memory 12. Then, the combination ratio calculation unit 262 calculates a long-time accumulation combination ratio on the basis of an image pickup signal of a past long-time accumulated pixel read from the frame memory 12 and an image pickup signal of a long-time accumulated pixel supplied from the image sensor 11. The combination ratio calculation unit 262 supplies the calculated long-time accumulation combination ratio to the frame memory 261 and causes the memory to hold the ratio.

By contrast, when in each long read interval, no image pickup signal of a long-time accumulated pixel is supplied from the image sensor 11, the combination ratio calculation unit 262 reads a long-time accumulation combination ratio of a group of the long-time accumulated pixels which is held in the frame memory 12.

Additionally, the combination ratio calculation unit 262 calculates a combination ratio on the basis of an image pickup signal of a long-time accumulated pixel and an image pickup signal of a short-time accumulated pixel supplied from the image sensor 11 (hereinafter, referred to as a combination ratio of both pixels) in each vertical synchronization period. In each vertical synchronization period, among the calculated long-time accumulation combination ratio or the read long-time accumulation combination ratio, and the combination ratio of both pixels, the combination ratio calculation unit 262 selects one whose change as time is smaller. The combination ratio calculation unit 262 supplies the selected combination ratio to the combination unit 16.

As described in the foregoing, when no image pickup signal of a long-time accumulated pixel is read from the image sensor 11, the image processing apparatus 260 reads a long-time accumulation combination ratio calculated last time in a group of the long-time accumulated pixel from the frame memory 261 and uses the same without calculating a long-time accumulation combination ratio.

Specifically, when no image pickup signal of a long-time accumulated pixel is read from the image sensor 11, an image pickup signal of a long-time accumulated pixel for use in calculation of a long-time accumulation combination ratio is an image pickup signal of a long-time accumulated pixel used for the last calculation of a long-time accumulation combination ratio of a group to which the long-time accumulated pixel belongs. Accordingly, the image processing apparatus 260 selects a combination ratio using the long-time accumulation combination ratio calculated last time. This eliminates a need of the image processing apparatus 260 to calculate a long-time accumulation combination ratio again on the basis of an image pickup signal of the same long-time accumulated pixel, thereby reducing a calculation cost. Additionally, when no image pickup signal of a long-time accumulated pixel is read from the image sensor 11, since it is not necessary to read an image pickup signal of a past long-time accumulated pixel from the frame memory 261 for the calculation of a long-time accumulation combination ratio, a band of the frame memory 261 can be suppressed.

(Description of Long-Time Accumulation Combination Ratio)

Figure 21:
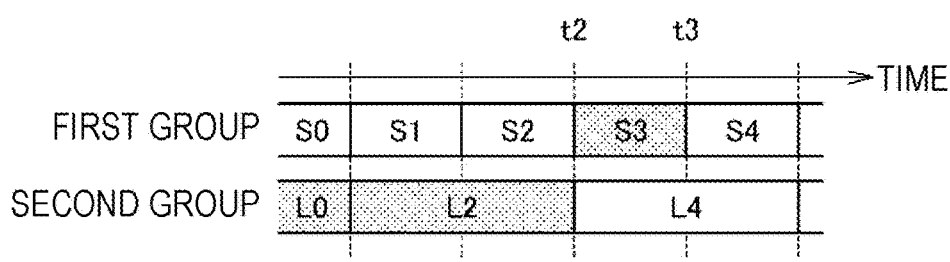
FIG. 21 is a diagram for explaining a long-time accumulation combination ratio calculated by a combination ratio calculation unit in FIG. 20.

FIG. 21 is a diagram for explaining a long-time accumulation combination ratio calculated by the combination ratio calculation unit 262 in FIG. 20.

In the example in FIG. 21, a read interval for the pixels 32 of the first and second groups is a read interval for A of FIG. 4.

In this case, as shown in FIG. 21, for example, at time t2 when an image pickup signal S2 of a short-time accumulated pixel is read from the pixels 32 in the first group, an image pickup signal L2 of a long-time accumulated pixel is read from the pixels 32 of the second group. Accordingly, the combination ratio calculation unit 262 generates a long-time accumulation combination ratio on the basis of the image pickup signal L2 of a long-time accumulated pixel and an image pickup signal L0 as an image pickup signal of a past long-time accumulated pixel of the image pickup signal L2. The long-time accumulation combination ratio is supplied to the frame memory 261 and held.

By contrast, at time t3 when an image pickup signal S3 of a short-time accumulated pixel is read from the pixels 32 in the first group, no image pickup signal of a long-time accumulated pixel is read from the pixels 32 of the second group. Accordingly, a long-time accumulation combination ratio at time t3 is determined on the basis of the image pickup signal L2 of a long-time accumulated pixel read immediately before from the pixels 32 in the second group, and the image pickup signal L0 as an image pickup signal of a past long-time accumulated pixel of the image pickup signal L2. Specifically, the long-time accumulation combination ratio at time t3 is the same as the long-time accumulation combination ratio at time t2.

Accordingly, at time t3, without calculating a long-time accumulation combination ratio, the combination ratio calculation unit 262 reads the long-time accumulation combination ratio as of time t2 held in the frame memory 261 and assumes the same as a long-time accumulation combination ratio of time t3.

(Description of Processing of Image Processing Apparatus)

Figure 22:
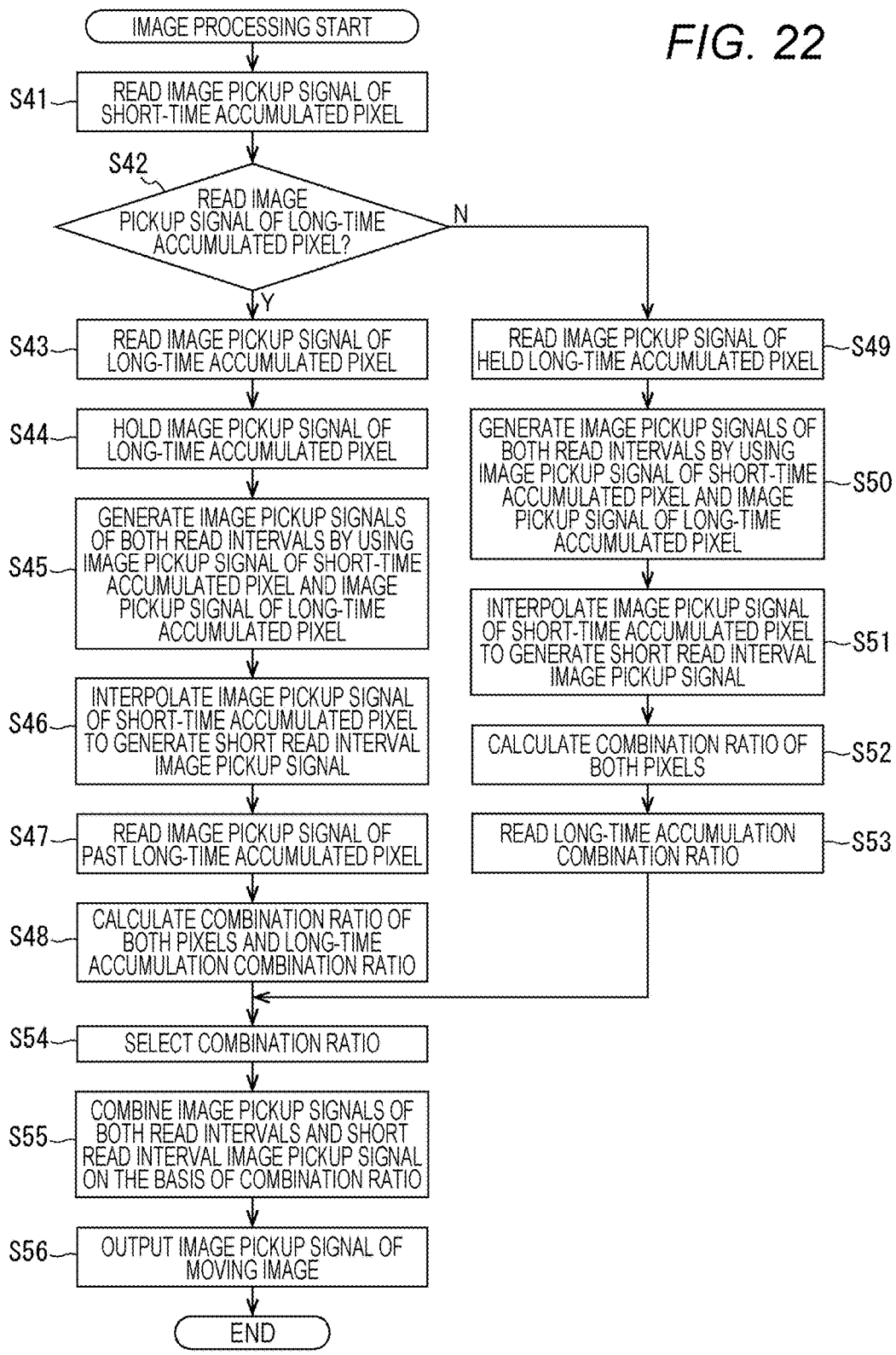
FIG. 22 is a flow chart for explaining image processing of the image processing apparatus in FIG. 20.

FIG. 22 is a flow chart for explaining image processing of the image processing apparatus 260 in FIG. 20. This image processing is conducted in each vertical synchronization period, for example.

Since processing of steps S41 to S46 in FIG. 22 is similar to the processing of step S11 to S14, S16, and S17 in FIG. 11, no description will be made thereof.

At step S47, the combination ratio calculation unit 262 of the image processing apparatus 260 reads an image pickup signal of a past long-time accumulated pixel from the frame memory 261.

At step S48, the combination ratio calculation unit 262 calculates a combination ratio of both pixels and a long-time accumulation combination ratio on the basis of an image pickup signal of a short-time accumulated pixel and an image pickup signal of a long-time accumulated pixel supplied from the image sensor 11, and an image pickup signal of a past long-time accumulated pixel read from the frame memory 261. The combination ratio calculation unit 262 supplies the calculated long-time accumulation combination ratio to the frame memory 261 and causes the memory to hold the same. Then, the processing is supplied to step S54.

By contrast, when determination is made at step S42 that an image pickup signal of a long-time accumulated pixel is not to be read, the processing proceeds to step S49. Since processing of steps S49 to S51 is similar to the processing of steps S15 to S17 in FIG. 11, description thereof will be omitted.

At step S52, the combination ratio calculation unit 262 reads an image pickup signal of a long-time accumulated pixel from the frame memory 261 and on the basis of the image pickup signal of the long-time accumulated pixel and the image pickup signal of the short-time accumulated pixel supplied from the image sensor 11, calculates a combination ratio of both pixels.

At step S53, the combination ratio calculation unit 262 reads, from the frame memory 261, a long-time accumulation combination ratio calculated last time in a group corresponding to the image pickup signal read from the frame memory 261 at step S52. Then, the processing is supplied to step S54.

At step S54, the combination ratio calculation unit 262 selects either one of the combination ratio of both pixels and the long-time accumulation combination ratio that has a smaller time change and supplies the same to the combination unit 16.

Since steps S55 and S56 are similar to the processing of steps S19 and S20 in FIG. 11, description thereof will be omitted.

<Eighth Embodiment>

(Configuration Example of Eighth Embodiment of Image Processing Apparatus)

An eighth embodiment of an image processing apparatus has a similar configuration to that of the image processing apparatus 10 in FIG. 1, except for a configuration of an image sensor. Accordingly, description will be made only of the image sensor hereinafter.

Figure 23:
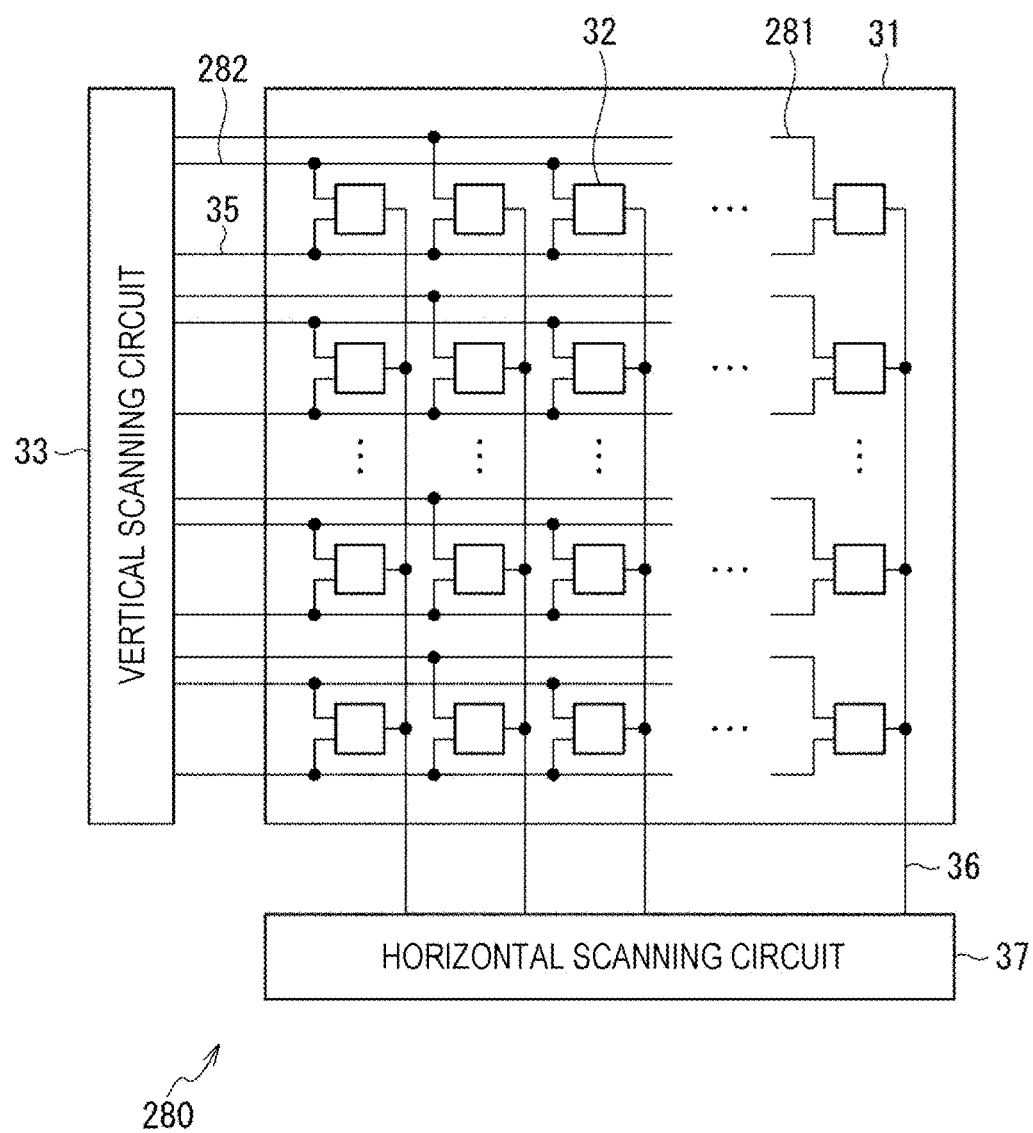
FIG. 23 is a block diagram showing a configuration example of an image sensor of an eighth embodiment of an image processing apparatus to which the present disclosure is applied.

FIG. 23 is a block diagram showing a configuration example of an image sensor of an eighth embodiment of the image processing apparatus to which the present disclosure is applied.

In the configuration shown in FIG. 23, the same components as those of FIG. 2 are given the same reference codes. Overlapping description will be appropriately omitted.

A configuration of an image sensor 280 in FIG. 23 is different from the configuration of the image sensor 11 in FIG. 2 in that in place of the horizontal reset line 34, horizontal reset lines 281 and 282 are provided. In the image sensor 280, the pixels 32 in the same row have different groups.

Specifically, the horizontal reset lines 281 and 282 of the image sensor 280 are provided on a basis of a row of the pixels 32. To one of adjacent pixels 32 in each row, the horizontal reset line 281 in the row is connected, and to the other, the horizontal reset line 282 is connected. Additionally, to one of adjacent pixels 32 in each column, the horizontal reset line 281 in a row of the pixel 32 is connected, and to the other, the horizontal reset line 282 in the row of the pixel 32 is connected.

To the horizontal reset lines 281 and 282 in each row, reset signals are supplied from the vertical scanning circuit 33 at timing different from each other. Specifically, to one of the horizontal reset line 281 and the horizontal reset line 282 in each row, the reset signal is supplied before supply of the read signal to the selection line 35 in the row by the short read interval. Additionally, to the other, the reset signal is supplied before supply of the read signal to the selection line 35 in the row by the long read interval.

(Example of Pixel Array)

FIG. 24 is a diagram showing an example of an array of the pixels 32 arranged in the pixel array unit 31 in FIG. 23.

As shown in FIG. 24, the pixels 32 in the same row in FIG. 23 are in different groups. For example, as shown in A of FIG. 24, when an array of the pixels 32 is a Bayer array, red pixels 32 and blue pixels 32 aligned in the horizontal direction and the vertical direction are respectively set to be in groups different from each other and green pixels 32 in each row are set to be in the same group.

Additionally, as shown in B of FIG. 24, when the array of the pixels 32 is an array in which each of 4×4 pixels 32 has the same color, or when as shown in C of FIG. 24, the array is an array in which lower left pixels 32 among 4×4 pixels are red or blue and the remaining three pixels 32 are green, adjacent pixels 32 in the horizontal direction and the vertical direction are set to be in different groups.

Note that while the image processing apparatus of the eighth embodiment includes the image sensor 280 in place of the image sensor 11, when the array of the pixels 32 is an array in which green pixels are highly dense as shown in C of FIG. 24 and a read interval of each group is fixed irrespective of time as shown in A of FIG. 4 to C of FIG. 4, the configuration of the image generation unit 13 can be replaced.

(Configuration Example of Image Generation Unit)

Figure 25:
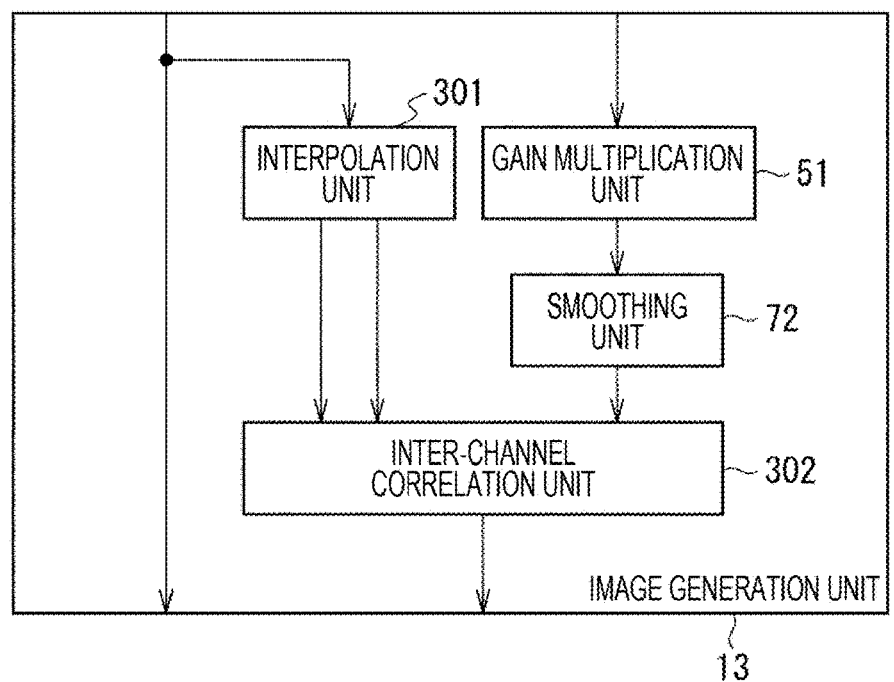
FIG. 25 is a block diagram showing a configuration example of an image generation unit in the eighth embodiment.

FIG. 25 is a block diagram showing a configuration example of the image generation unit 13 in such a case.

In the configuration shown in FIG. 25, the same components as those of FIG. 6 are given the same reference codes. Overlapping description will be appropriately omitted.

The image generation unit 13 in FIG. 25 is configured with the gain multiplication unit 51, the smoothing unit 72, an interpolation unit 301 and a correlation unit 302. The image generation unit 13 generates image pickup signals of both read intervals of a short-time accumulated pixel from an image pickup signal of a long-time accumulated pixel and an image pickup signal of a short-time accumulated pixel by using inter-channel correlation.

Specifically, the image generation unit 13 outputs an image pickup signal of a long-time accumulated pixel supplied from the image sensor 280 in FIG. 23 as image pickup signals of both read intervals of a long-time accumulated pixel.

The interpolation unit 301 of the image generation unit 13 conducts filtering processing with respect to an image pickup signal of a green pixel as a long-time accumulated pixel supplied from the image sensor 280 by using an LPF having a wide passband to generate a high-frequency image pickup signal G_H.

The interpolation unit 301 also conducts filtering processing with respect to an image pickup signal of a green pixel as a long-time accumulated pixel supplied from the image sensor 280 by using an LPF having a narrow passband to generate a low-frequency image pickup signal G_L. The interpolation unit 301 supplies the high-frequency image pickup signal G_H and the low-frequency image pickup signal G_L to the correlation unit 302.

The correlation unit 302 obtains a high-frequency image pickup signal R_H of a red pixel from Formula (1) below by using an image pickup signal R_L of a red pixel among low-frequency image pickup signals of short-time accumulated pixels smoothed by the smoothing unit 72, and the image pickup signal G_H and the image pickup signal G_L supplied from the interpolation unit 301. The correlation unit 302 combines the image pickup signal R_H and the image pickup signal R_L and outputs a resultantly obtained image pickup signal as image pickup signals of both read intervals of a red short-time accumulated pixel.

[Mathematical Formula 1]

$$R\_H = R\_L + G\_H * (R\_L/G\_L) \quad (1)$$

Additionally, the correlation unit 302, similarly to the image pickup signal R_H, obtains a high-frequency image pickup signal B_H of a blue pixel by using an image pickup signal B_L of a blue pixel among the low-frequency image pickup signals of short-time accumulated pixels smoothed by the smoothing unit 72, and the image pickup signal G_H and the image pickup signal G_L. The correlation unit 302 combines the image pickup signal B_H and the image pickup signal B_L and outputs a resultantly obtained image pickup signal as image pickup signals of both read intervals of a blue short-time accumulated pixel.

Further, the correlation unit 302 outputs an image pickup signal of a green short-time accumulated pixel smoothed by the smoothing unit 72 as image pickup signals of both read intervals of a green short-time accumulated pixel.

Since image processing of the image processing apparatus of the eighth embodiment is similar to that of the image processing apparatus in FIG. 11, description thereof will be omitted.

Note that although in the image processing apparatus of the eighth embodiment, the image sensor 11 in the first embodiment is replaced by the image sensor 280, the image sensors 11 in the second to seventh embodiments may be replaced by the image sensor 280.

<Ninth Embodiment>
(Configuration Example of Ninth Embodiment of Image Processing Apparatus)

Figure 26:
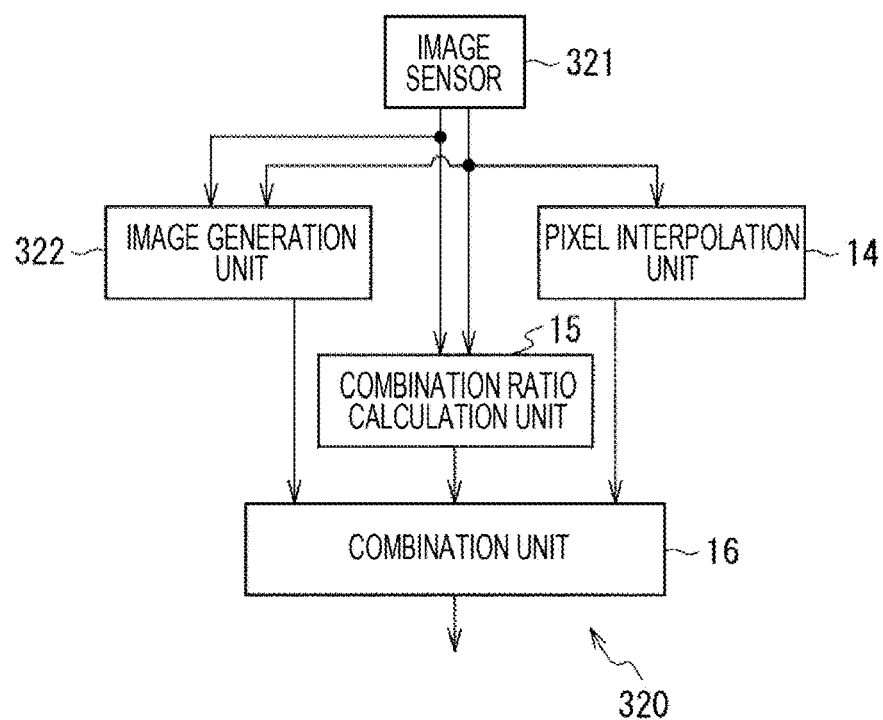
FIG. 26 is a block diagram showing a configuration example of a ninth embodiment of an image processing apparatus to which the present disclosure is applied.

FIG. 26 is a block diagram showing a configuration example of a ninth embodiment of an image processing apparatus to which the present disclosure is applied.

In the configuration shown in FIG. 26, the same components as those of FIG. 1 are given the same reference codes. Overlapping description will be appropriately omitted.

A configuration of an image processing apparatus 320 in FIG. 26 is different from the configuration of the image processing apparatus 10 in FIG. 1 in that the image sensor 11 is replaced by an image sensor 321, the image generation unit 13 is replaced by an image generation unit 322, and the frame memory 12 is not provided. In the image processing apparatus 320, the pixels 32 are divided into three or more groups, from which both image pickup signals of a short-time accumulated pixel and a long-time accumulated pixel are read in each vertical synchronization period.

Specifically, the image sensor 321 of the image processing apparatus 320 has a plurality of pixels 32, and the respective pixels 32 are classified into three or more groups according to a pattern of change with time of a read interval for an image pickup signal of each pixel 32.

Note that a pattern of each group is determined such that in each vertical synchronization period, read timing of an image pickup signal of a long-time accumulated pixel in at least one group is generated. Accordingly, in each vertical synchronization period, an image pickup signal of a short-time accumulated pixel in at least one group and an image pickup signal of a long-time accumulated pixel in at least one other group are read from the image sensor 321. Accordingly, it is not necessary to make the frame memory 12 hold an image pickup signal of a long-time accumulated pixel.

The image sensor 321 reads image pickup signals of long-time accumulated pixels classified into at least one group at the long read interval and supplies the same to the image generation unit 322 and the combination ratio calculation unit 15. Additionally, the image sensor 321 reads image pickup signals of short-time accumulated pixels classified into at least one other group at the short read interval and supplies the same to the image generation unit 322, the pixel interpolation unit 14 and the combination ratio calculation unit 15.

A configuration of the image generation unit 322 is similar to the configuration of the image generation unit 13 in FIG. 7, except that an image pickup signal of a long-time accumulated pixel is supplied only from the image sensor 321. The image generation unit 322 generates image pickup signals of all the pixels in each vertical synchronization period by using an image pickup signal of a short-time accumulated pixel and an image pickup signal of a long-time accumulated pixel supplied from the image sensor 321. The image generation unit 322 supplies the generated image pickup signals of all the pixels to the combination unit 16 as image pickup signals of both read intervals.

(Example of Read Interval of Each Group)

Figure 27:
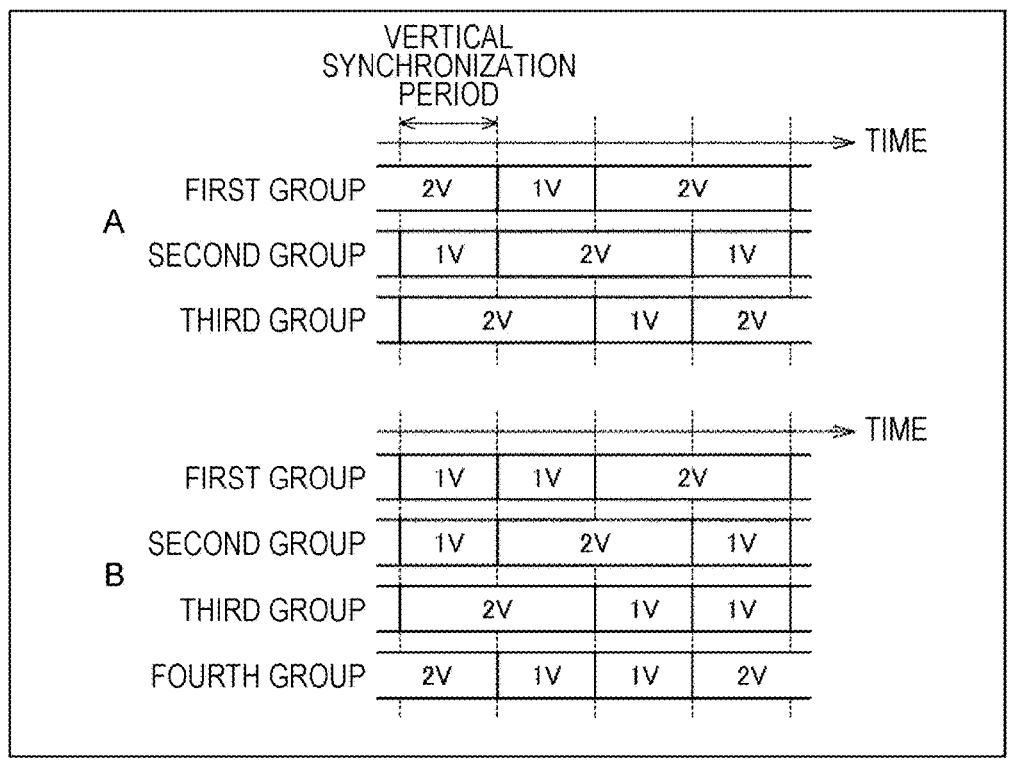
FIG. 27 is a diagram showing an example of a pixel read interval of each group in FIG. 26.

FIG. 27 is a diagram showing an example of a read interval of the pixels 32 in each group in FIG. 26.

In an example of A of FIG. 27, the pixels 32 are classified into first to third groups. The pixels 32 in each group alternately become short-time accumulated pixels and long-time accumulated pixels, and a long read interval is twice the vertical synchronization period. Additionally, when the pixels 32 of at least one group of the first to third groups are in the vertical synchronization period of a first half of the long read interval, the pixels 32 of other one group are in the vertical synchronization period of a second half of the long read interval, and the pixels 32 of the remaining one group are in the short read interval. Accordingly, in each vertical synchronization period, image pickup signals of the long-time accumulated pixels in the first to third groups are sequentially read.

In an example of B of FIG. 27, the pixels 32 are classified into first to fourth groups. The pixels 32 in each group repeatedly become short-time accumulated pixels twice and then become long-time accumulated pixels, and a long read interval is twice the vertical synchronization period. Additionally, when the pixels 32 of one of the first to fourth groups are in the vertical synchronization period of the first half of the long read interval, the pixels 32 of other one group are in the vertical synchronization period of a second half of the long read interval, and the pixels 32 of the remaining two groups are in the short read interval. Accordingly, in each vertical synchronization period, image pickup signals of the long-time accumulated pixels in the first to fourth groups are sequentially read.

Since image processing of the image processing image processing apparatus 320 in FIG. 26 is similar to the image processing in FIG. 11, except that the processing of steps S12, S14, and S15 are not conducted and at step S16, an image pickup signal of a long-time accumulated pixel read from the image sensor 321 is used for generation of image pickup signals of both read intervals, description thereof will be omitted.

<Tenth Embodiment>
(Configuration Example of Tenth Embodiment of Image Processing Apparatus)

Figure 28:
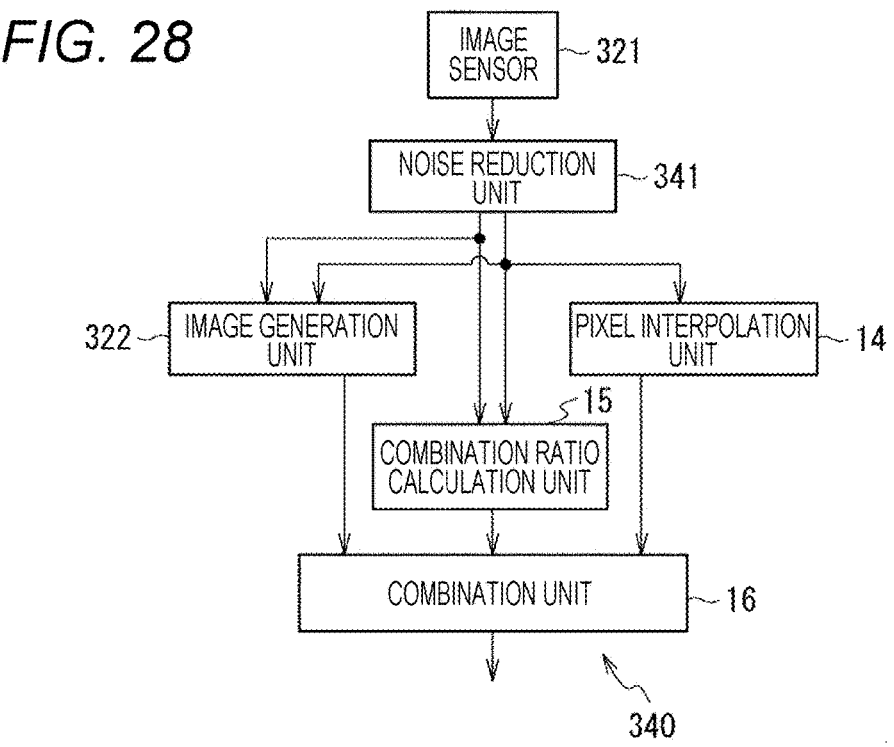
FIG. 28 is a block diagram showing a configuration example of a tenth embodiment of an image processing apparatus to which the present disclosure is applied.

FIG. 28 is a block diagram showing a configuration example of a tenth embodiment of an image processing apparatus to which the present disclosure is applied.

In the configuration shown in FIG. 28, the same components as those of FIG. 26 are given the same reference codes. Overlapping description will be appropriately omitted.

A configuration of an image processing apparatus 340 in FIG. 28 is different from the configuration of the image processing apparatus 320 in FIG. 26 in that a noise reduction unit 341 is newly provided. Similarly to the image processing apparatus 170 in FIG. 14, the image processing apparatus 340 conducts noise reduction with intensities different from each other with respect to image pickup signals of long-time accumulated pixels and short-time accumulated pixels.

Specifically, a configuration of the noise reduction unit 341 of the image processing apparatus 340 is similar to the configuration of the noise reduction unit 171 in FIG. 14, except that an image pickup signal of a long-time accumulated pixel is supplied from the image sensor 321. An image pickup signal of a long-time accumulated pixel subjected to noise reduction by the noise reduction unit 341 is supplied to the image generation unit 322 and the combination ratio calculation unit 15. Additionally, an image pickup signal of a short-time accumulated pixel subjected to noise reduction by the noise reduction unit 341 is supplied to the image generation unit 322, the combination ratio calculation unit 15, and the pixel interpolation unit 14.

Image processing of the image processing apparatus 340 is similar to the image processing of the image processing apparatus 320 in FIG. 26, except for the following points. Specifically, the image processing of the image processing apparatus 340 is different from the image processing of the image processing apparatus 320 in that between steps S11 and S13, the noise reduction unit 341 conducts noise reduction with respect to an image pickup signal of a short-time accumulated pixel. Additionally, the image processing of the image processing apparatus 340 is different from the image processing of the image processing apparatus 320 in that between steps S13 and S16, the noise reduction unit 341 conducts noise reduction of an image pickup signal of a long-time accumulated pixel.

Note that the noise reduction unit 341 may conduct noise reduction with the same intensity with respect to image pickup signals of both a long-time accumulated pixel and a short-time accumulated pixel.

<Eleventh Embodiment>
(Configuration Example of Eleventh Embodiment of Image Processing Apparatus)

Figure 29:
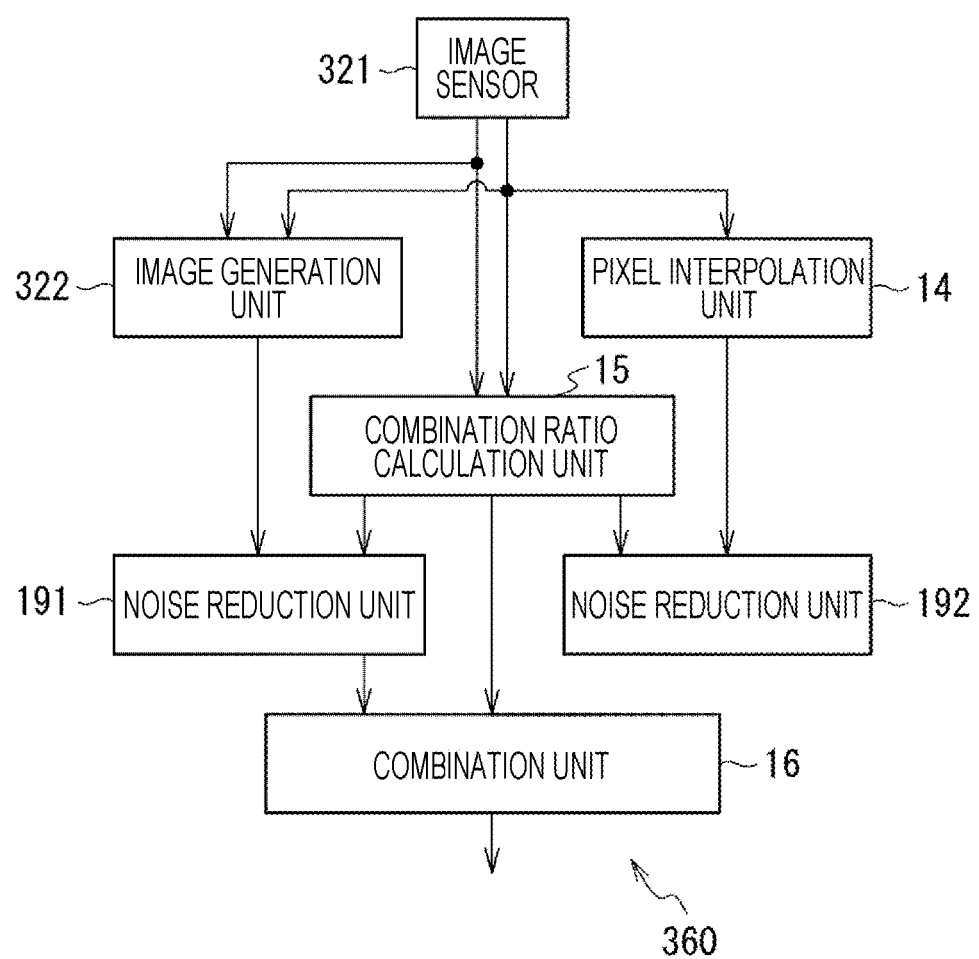
FIG. 29 is a block diagram showing a configuration example of an eleventh embodiment of an image processing apparatus to which the present disclosure is applied.
Figure 30:
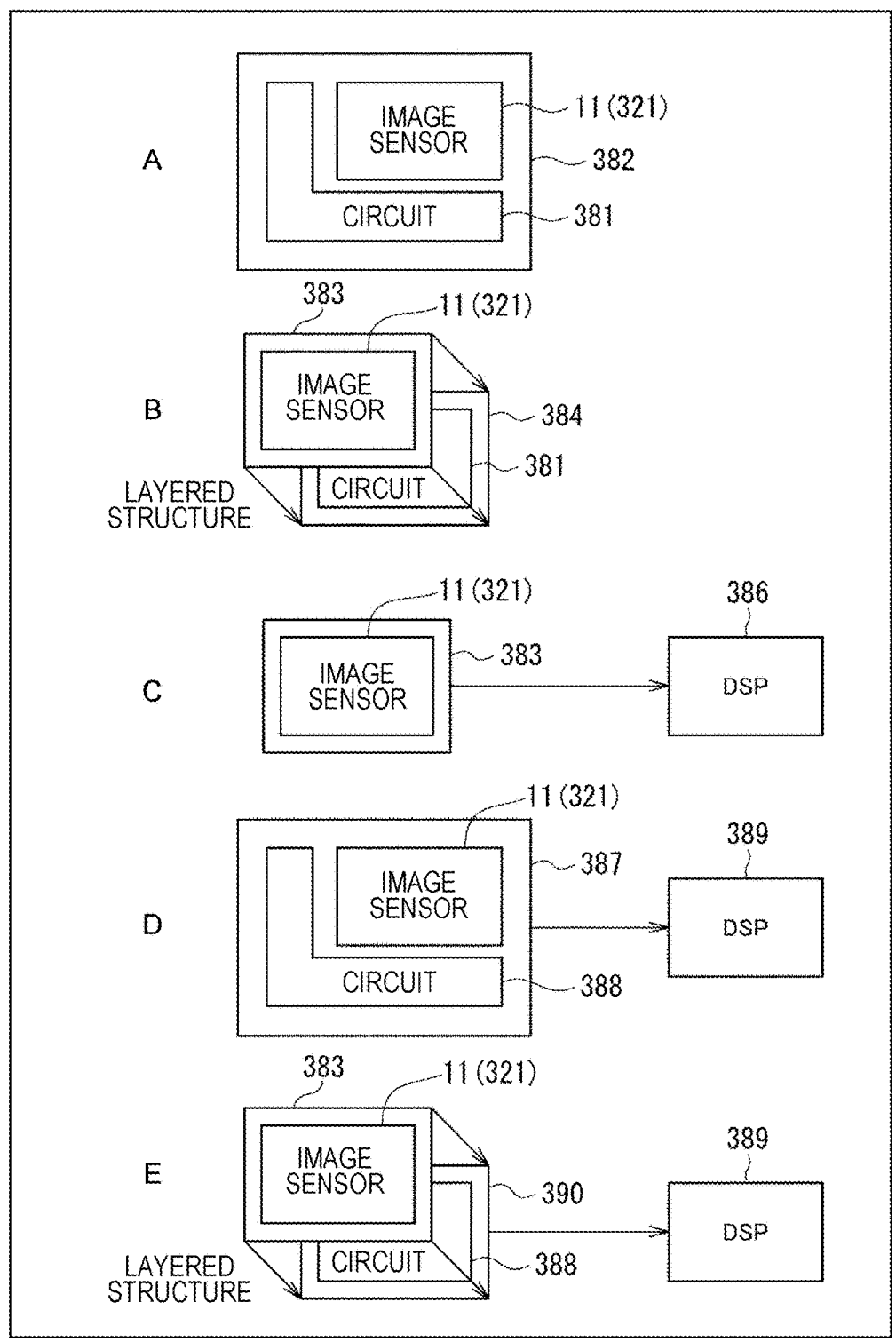
FIG. 30 is a diagram showing a configuration of a semiconductor substrate.

FIG. 29 is a block diagram showing a configuration example of an eleventh embodiment of an image processing apparatus to which the present disclosure is applied.

In the configuration shown in FIG. 29, the same components as those of FIG. 15 and FIG. 26 are given the same reference codes. Overlapping description will be appropriately omitted.

A configuration of an image processing apparatus 360 in FIG. 29 is different from the configuration of the image processing apparatus 320 in FIG. 26 in that the noise reduction unit 191 and the noise reduction unit 192 are provided. Similarly to the image processing apparatus 190 in FIG. 15, the image processing apparatus 360 conducts noise reduction with respect to image pickup signals of both read intervals and a short read interval image pickup signal.

Since image processing of the image processing apparatus 360 is similar to the image processing of the image processing image processing apparatus 320 in FIG. 26, except that between step S17 and step S18, noise reduction is conducted by the noise reduction unit 191 and the noise reduction unit 192, description thereof will be omitted.

Note that the image processing apparatus 360 may be provided with the noise reduction unit 341. Additionally, while in the ninth to eleventh embodiments, the frame memory 12 is not provided, the frame memory 12 may be provided. In this case, the image generation unit 322 is supplied with an image pickup signal of a long-time accumulated pixel from the image sensor 321 via the frame memory 12.

<Mode of Image Processing Apparatus>
FIG. 30 is a diagram showing a configuration of a semiconductor substrate (chip) in a case where the above-described image processing apparatus is formed on the semiconductor substrate.

As shown in A of FIG. 30 and B of FIG. 30, the configuration of the image processing apparatuses of the first to eleventh embodiments excluding the image sensor 11 (321) is realized by, for example, a circuit 381. This circuit 381 is formed, for example, on the same semiconductor substrate 382 as that of the image sensor 11 (321) as shown in A of FIG. 30. Alternatively, out of layered semiconductor substrate 383 and semiconductor substrate 384, the circuit is formed on the semiconductor substrate 384 on which the image sensor 11 (321) is not formed as shown in B of FIG. 30.

Additionally, as shown in C of FIG. 30, the configuration of the image processing apparatuses of the first to eleventh embodiments except for the image sensor 11 (321) can be also realized by, for example, a digital signal processing (DSP) 386 at a stage subsequent to the semiconductor substrate 383 on which the image sensor 11 (321) is formed.

Additionally, as shown in D of FIG. 30 and E of FIG. 30, the configuration of the image processing apparatuses of the first to eleventh embodiments except for the image sensor 11 (321) can be also realized by, for example, a circuit 388 and a DSP 389. In this case, as shown in D of FIG. 30, the circuit 388 is formed on the same semiconductor substrate 387 as that of the image sensor 11 (321), and the DSP 389 is provided at a stage subsequent to the semiconductor substrate 387. Alternatively, as shown in E of FIG. 30, out of layered semiconductor substrate 383 and semiconductor substrate 390, the circuit 388 is formed on the semiconductor substrate 390 on which the image sensor 11 (321) is not formed, and the DSP 389 is provided at a stage subsequent to the layered semiconductor substrate 387 and semiconductor substrate 390.

Note that the effects recited in the present specification are for illustrative purpose only and not to be construed as limiting, and may include other effects.

Additionally, the embodiments of the present disclosure are not limited to the above-described embodiments and various modifications can be made without departing from the gist of the present disclosure.

For example, the pixels 32 may have three or more kinds of exposure lengths. In this case, also in the ninth embodiment, a read interval of each pixel 32 may be constantly fixed.

Note that the present disclosure can also take the following configurations.

(1)

An image processing apparatus including:

a plurality of pixels whose image pickup signal has a read interval as a first multiple of a vertical synchronization period or as a second multiple larger than the first multiple of the vertical synchronization period; and a holding unit which holds the image pickup signal of a long-time accumulated pixel as the pixel having the read interval as the second multiple of the vertical synchronization period.

(2)

The image processing apparatus according to (1), wherein a predetermined pixel of the plurality of pixels is always a short-time accumulated pixel as the pixel having the read interval as the first multiple of the vertical synchronization period and other pixel than the predetermined pixel is always the long-time accumulated pixel.

(3)

The image processing apparatus according to (1), wherein the read interval of the pixel changes with time.

(4)

The image processing apparatus according to (3), wherein the plurality of pixels are classified into a plurality of groups according to a pattern of a change with time of the read interval for the pixel.

(5)

The image processing apparatus according to (4), wherein timing of a change of the read interval for each of the pixels classified into all the groups is the same.

(6)

The image processing apparatus according to (4), wherein the read interval of each of the pixels classified into all the groups alternately changes from one of the first multiple of the vertical synchronization period and the second multiple of the vertical synchronization period to the other.

(7)

The image processing apparatus according to any of (1) to (6), further including:

an image generation unit which combines the image pickup signal of the long-time accumulated pixel among the plurality of pixels and the image pickup signal of a short-time accumulated pixel as the pixel having the read interval as the first multiple of the vertical synchronization period to generate image pickup signals of both read intervals;

a pixel interpolation unit which interpolates the image pickup signal of the short-time accumulated pixel among the plurality of pixels to generate a short read interval image pickup signal as an image pickup signal of each of the plurality of pixels; and a combination unit which combines the image pickup signals of both read intervals generated by the image generation unit and the short read interval image pickup signal generated by the pixel interpolation unit.

(8)

The image processing apparatus according to (7), further including a combination ratio calculation unit which calculates a ratio of combination by the combination unit on the basis of the image pickup signal of the long-time accumulated pixel and the image pickup signal of the short-time accumulated pixel.

(9)

The image processing apparatus according to (8), wherein the combination ratio calculation unit calculates the ratio of combination on the basis of the image pickup signal of the long-time accumulated pixel combined by the image generation unit, the image pickup signal of the same long-time accumulated pixel which is immediately before that image pickup signal and is held by the holding unit, and the image pickup signal of the short-time accumulated pixel.

(10)

The image processing apparatus according to (9), wherein the holding unit holds the ratio of combination calculated by the combination ratio calculation unit, and the combination unit combines the image pickup signals of both read intervals and the short read interval image pickup signal at the ratio of combination held by the holding unit.

(11)

The image processing apparatus according to any of (7) to (10), wherein the image generation unit combines the image pickup signal of the long-time accumulated pixel held by the holding unit and the image pickup signal of the short-time accumulated pixel.

(12)

The image processing apparatus according to (11), further including:

a motion compensation unit which conducts motion compensation of the image pickup signal of the long-time accumulated pixel held by the holding unit, wherein the image generation unit combines the image pickup signal subjected to the motion compensation by the motion compensation unit and the image pickup signal of the short-time accumulated pixel.

(13)

The image processing apparatus according to any of (7) to (12), further including:

a motion blur correction unit which corrects a motion blur of the image pickup signal of the long-time accumulated pixel and the image pickup signal of the short-time accumulated pixel, wherein the image generation unit combines the image pickup signal of the long-time accumulated pixel and the image pickup signal of the short-time accumulated pixel which have the motion blurs corrected by the motion blur correction unit.

(14)

The image processing apparatus according to any of (7) to (13), further including:

a noise reduction unit which conducts noise reduction with intensities different from each other with respect to the image pickup signal of the long-time accumulated pixel and the image pickup signal of the short-time accumulated pixel, wherein the image generation unit combines the image pickup signal of the long-time accumulated pixel and the image pickup signal of the short-time accumulated pixel which are subjected to the noise reduction by the noise reduction unit.

(15)

The image processing apparatus according to any of (7) to (14), further including:

a both read interval noise reduction unit which conducts noise reduction with a first intensity with respect to the image pickup signals of both read intervals generated by the image generation unit; and a short read interval noise reduction unit which conducts noise reduction with a second intensity different from the first intensity with respect to the short read interval image pickup signal generated by the pixel interpolation unit, wherein the combination unit combines the image pickup signals of both read intervals subjected to the noise reduction by the both read interval noise reduction unit and the short read interval image pickup signal subjected to the noise reduction by the short read interval noise reduction unit.

(16)

An image processing method of an image processing apparatus having a plurality of pixels including:

a reading step of reading an image pickup signal from the pixels at a read interval as a first multiple of a vertical synchronization period or as a second multiple larger than the first multiple of the vertical synchronization period; and a holding step of holding the image pickup signal read at the read interval as the second multiple of the vertical synchronization period by processing of the reading step.

REFERENCE SIGNS LIST

10 Image processing apparatus
12 Frame memory
13 Image generation unit
14 Pixel interpolation unit
15 Combination ratio calculation unit
16 Combination unit
32 Pixel
130 Image processing apparatus
131 Motion compensation unit
150 Image processing apparatus
151 Motion blur correction unit
170 Image processing apparatus
171 Noise reduction unit
190 Image processing apparatus
191, 192 Noise reduction unit

The invention claimed is:

1. An image processing apparatus comprising:
a plurality of pixels whose image pickup signal has a read interval as a first multiple of a vertical synchronization period or as a second multiple larger than the first multiple of the vertical synchronization period; and
a holding unit which holds the image pickup signal of a long-time accumulated pixel as the pixel having the read interval as the second multiple of the vertical synchronization period;
wherein the read interval of the pixel changes with time, the plurality of pixels are classified into a plurality of groups according to a pattern of a change with time of the read interval for the pixel, and timing of a change of the read interval for each of the pixels classified into all the groups is the same.

2. The image processing apparatus according to claim 1, wherein a predetermined pixel of the plurality of pixels is always a short-time accumulated pixel as the pixel having the read interval as the first multiple of the vertical synchronization period and other pixel than the predetermined pixel is always the long-time accumulated pixel.

3. An image processing apparatus comprising:
a plurality of pixels whose image pickup signal has a read interval as a first multiple of a vertical synchronization period or as a second multiple larger than the first multiple of the vertical synchronization period; and
a holding unit which holds the image pickup signal of a long-time accumulated pixel as the pixel having the read interval as the second multiple of the vertical synchronization period;
wherein the read interval of the pixel changes with time, the plurality of pixels are classified into a plurality of groups according to a pattern of a change with time of the read interval for the pixel, wherein the read interval of each of the pixels classified into all the groups alternately changes from one of the first multiple of the vertical synchronization period and the second multiple of the vertical synchronization period to the other.

4. An image processing apparatus comprising:
a plurality of pixels whose image pickup signal has a read interval as a first multiple of a vertical synchronization period or as a second multiple larger than the first multiple of the vertical synchronization period; and
a holding unit which holds the image pickup signal of a long-time accumulated pixel as the pixel having the read interval as the second multiple of the vertical synchronization period, further comprising:
an image generation unit which combines the image pickup signal of the long-time accumulated pixel among the plurality of pixels and the image pickup signal of a short-time accumulated pixel as the pixel having the read interval as the first multiple of the vertical synchronization period to generate image pickup signals of both read intervals;
a pixel interpolation unit which interpolates the image pickup signal of the short-time accumulated pixel among the plurality of pixels to generate a short read interval image pickup signal as an image pickup signal of each of the plurality of pixels; and
a combination unit which combines the image pickup signals of both read intervals generated by the image generation unit and the short read interval image pickup signal generated by the pixel interpolation unit.

5. The image processing apparatus according to claim 4, further comprising a combination ratio calculation unit which calculates a ratio of combination by the combination unit on the basis of the image pickup signal of the long-time accumulated pixel and the image pickup signal of the short-time accumulated pixel.

6. The image processing apparatus according to claim 5, wherein the combination ratio calculation unit calculates the ratio of combination on the basis of the image pickup signal of the long-time accumulated pixel combined by the image generation unit, the image pickup signal of the same long-time accumulated pixel which is immediately before that image pickup signal and is held by the holding unit, and the image pickup signal of the short-time accumulated pixel.

7. The image processing apparatus according to claim 6, wherein the holding unit holds the ratio of combination calculated by the combination ratio calculation unit, and the combination unit combines the image pickup signals of both read intervals and the short read interval image pickup signal at the ratio of combination held by the holding unit.

8. The image processing apparatus according to claim 4, wherein the image generation unit combines the image pickup signal of the long-time accumulated pixel held by the holding unit and the image pickup signal of the short-time accumulated pixel.

9. The image processing apparatus according to claim 8, further comprising:

a motion compensation unit which conducts motion compensation of the image pickup signal of the long-time accumulated pixel held by the holding unit, wherein the image generation unit combines the image pickup signal subjected to the motion compensation by the motion compensation unit and the image pickup signal of the short-time accumulated pixel.

10. The image processing apparatus according to claim 4, further comprising:

a motion blur correction unit which corrects a motion blur of the image pickup signal of the long-time accumulated pixel and the image pickup signal of the short-time accumulated pixel, wherein the image generation unit combines the image pickup signal of the long-time accumulated pixel and the image pickup signal of the short-time accumulated pixel which have the motion blurs corrected by the motion blur correction unit.

11. The image processing apparatus according to claim 4, further comprising:

a noise reduction unit which conducts noise reduction with intensities different from each other with respect to the image pickup signal of the long-time accumulated pixel and the image pickup signal of the short-time accumulated pixel, wherein the image generation unit combines the image pickup signal of the long-time accumulated pixel and the image pickup signal of the short-time accumulated pixel which are subjected to the noise reduction by the noise reduction unit.

12. The image processing apparatus according to claim 4, further comprising:

a both read interval noise reduction unit which conducts noise reduction with a first intensity with respect to the image pickup signals of both read intervals generated by the image generation unit; and a short read interval noise reduction unit which conducts noise reduction with a second intensity different from the first intensity with respect to the short read interval image pickup signal generated by the pixel interpolation unit, wherein the combination unit combines the image pickup signals of both read intervals subjected to the noise reduction by the both read interval noise reduction unit and the short read interval image pickup signal subjected to the noise reduction by the short read interval noise reduction unit.

* * * * *